(12) United States Patent
Macura et al.

(10) Patent No.: US 9,670,021 B2
(45) Date of Patent: Jun. 6, 2017

(54) MANDREL

(71) Applicant: The Procter & Gamble Company, Cincinnati, OH (US)

(72) Inventors: Matthew Joseph Macura, Loveland, OH (US); Rong Deng, Mason, OH (US); Craig Allen Powell, Independence, KY (US); Todd Douglas Lenser, Liberty Township, OH (US); Martin Geoffrey Scaife, Singapore (SG)

(73) Assignee: The Procter & Gamble Company, Cincinnati, OH (US)

(*) Notice: Subject to any disclaimer, the term of this patent is extended or adjusted under 35 U.S.C. 154(b) by 161 days.

(21) Appl. No.: 14/471,355

(22) Filed: Aug. 28, 2014

(65) Prior Publication Data

US 2016/0060061 A1    Mar. 3, 2016

(51) Int. Cl.
| | |
|---|---|
| *B66C 1/00* | (2006.01) |
| *B66C 1/54* | (2006.01) |
| *B65H 19/12* | (2006.01) |
| *B65H 75/24* | (2006.01) |
| *B65H 16/10* | (2006.01) |

(52) U.S. Cl.
CPC ........... *B65H 19/126* (2013.01); *B65H 16/10* (2013.01); *B65H 19/123* (2013.01); *B65H 75/242* (2013.01); *B65H 2701/37* (2013.01)

(58) Field of Classification Search
CPC .... B65H 75/24; B65H 19/126; B65H 75/185; B65H 75/08; B65H 75/242; B65H 19/123; B65H 2701/37; B65H 16/10
USPC ............................................. 294/93; 242/571
See application file for complete search history.

(56) References Cited

U.S. PATENT DOCUMENTS

| | | | |
|---|---|---|---|
| 3,836,089 | A | 9/1974 | Riemersma et al. |
| 4,331,418 | A | 5/1982 | Klebe |
| 4,726,725 | A | 2/1988 | Baker et al. |
| 4,733,576 | A | 3/1988 | Zimmer et al. |
| 5,209,247 | A | 5/1993 | Rittershaus et al. |

(Continued)

FOREIGN PATENT DOCUMENTS

| | | |
|---|---|---|
| DE | 4041865 A1 | 7/1992 |
| EP | 2412348 B1 | 3/2014 |

(Continued)

OTHER PUBLICATIONS

PCT International Search Report, mailed Nov. 9, 2015, 109 pages.

*Primary Examiner* — Stephen Vu
(74) *Attorney, Agent, or Firm* — Peter D. Meyer

(57) ABSTRACT

A mandrel suitable for supporting and unwinding a convolutely wound web material is disclosed. The mandrel has a mandrel shaft with a longitudinal axis, a plurality of mandrel arms extending from the mandrel shaft, and at least one expansion element disposed upon a respective each of the mandrel arms. The mandrel shaft is capable of rotating about the longitudinal axis. Each of the mandrel arms is disposed and rotatable about the longitudinal axis. The at least one expansion element is expandable radially away from the respective mandrel arm relative to the longitudinal axis. The convolutely wound web material is disposable about each of the mandrel arms. Further, the at least one expansion element is expandable into contacting and releasable engagement with the convolutely wound web material. The convolutely wound web material is fixably and releasably disposed about each of the mandrel arms.

15 Claims, 20 Drawing Sheets

(56) References Cited

U.S. PATENT DOCUMENTS

| | | |
|---|---|---|
| 5,305,652 A | 4/1994 | Zimmer |
| 6,604,704 B2 | 8/2003 | Kiprowski |
| 6,685,130 B2 | 2/2004 | Stauber et al. |
| 6,731,091 B2 | 5/2004 | Hietmann et al. |
| 6,736,348 B1 | 5/2004 | Formon et al. |
| 6,978,964 B2 | 12/2005 | Beccari |
| 7,350,740 B2 | 4/2008 | Benvenuti et al. |
| 7,984,603 B2 | 7/2011 | Freudenberg et al. |
| 8,219,245 B2 | 7/2012 | Merk et al. |
| 2006/0180699 A1 | 8/2006 | Cranston, III et al. |
| 2013/0056576 A1 | 3/2013 | Andrews et al. |
| 2015/0090831 A1 | 4/2015 | Huber et al. |

FOREIGN PATENT DOCUMENTS

| | | |
|---|---|---|
| JP | H0781810 A | 3/1995 |
| JP | 2005138938 A | 6/2005 |

MANDREL

FIELD OF THE INVENTION

The present disclosure relates generally to an apparatus for moving and supporting web material, such as polyethylene into a web consuming apparatus such as a converter for manufacturing disposable absorbent articles. The present disclosure more particularly relates to the use of an improved mandrel for loading, unloading, supporting, and/or unwinding convolutley wound rolls of web materials for producing diapers and catamenial devices.

BACKGROUND OF THE INVENTION

In order to continuously supply a web consuming apparatus with web from a succession of rolls of web material each new roll must be spliced to the preceding roll. Desirably, this is done without diminishing the rate of forwarding web to the web consuming apparatus. As such, a continuous supply of convolutely wound rolls of web material must be supplied to the apparatus in order to maintain manufacturing speeds.

Today, in most manufacturing site, manual operation remains the most common for material handling & delivery. In most operations, the assembled products materials are processed on-line as webs and a vast majority of these web materials are brought to the line as planetary rolls of convolutely wound rolls of web material.

It will also be appreciated that raw material handling accounts for 30-50% of operational tasks across an assembled products manufacturing line today. This includes delivery, staging, roll preparation, and loading. Additionally, increasing line speeds increases the frequency of roll changes and drives higher operational efforts. In short, the manual loading of roll materials into an assembled products line is often found to be cost prohibitive.

Further, the floor space necessary today for unwind stands and raw material staging is roughly equal to the space necessary for the placement of an assembled goods converting operation. Additionally, future innovation tends to bring more complex assembled goods products and requires significantly more web materials. This confounds current manufacturing operations as floor space is likely fully used already. Thus, finding additional floor space to accommodate both the existing assembled products lines and the expanded requirements to accommodate these additional lines is problematic.

Some solutions to this issue have been to utilize additional floor space to incorporate automation solutions. But seemingly, floor space is at a premium. However, current automation solutions provide significant safety concerns due to the increased risk of human injury or equipment damage. Others have provided additional equipment formats such as festooning, traversing wound rolls, and the like to extend roll life and reduce manual effort required to load such materials. However, these solutions only work for a limited range of materials.

Net—there is a compelling need to eliminate the manual effort required to stage, prepare, load, and thread up web materials to feed the converting equipment to manufacture assembled goods such as catamenial devices and diapers. There is a compelling need to reduce the floor space required for material staging, preparation, loading, and unwind convolutely wound materials, inclusive of automation. Further, there is a compelling need to enable a 'lights-out' web material supply solution that is nearly capital equal to current unwind operations. Additionally, there is a compelling need to support agile manufacturing principles on converting lines that enable easy reconfigurability. Thus, it would be beneficial to solve these challenges of footprint, effort, and cost simultaneously. The present description solves these challenges.

SUMMARY OF THE INVENTION

The present disclosure provides for a mandrel suitable for supporting and unwinding a convolutely wound web material where a portion of the convolutely wound web material forms a hollow core therein. The mandrel comprises a mandrel shaft having a longitudinal axis, a plurality of mandrel arms extending from the mandrel shaft, and at least one expansion element disposed upon a respective each of the mandrel arms. The mandrel shaft is capable of rotating about the longitudinal axis. Each of the mandrel arms is disposed and rotatable about the longitudinal axis. The at least one expansion element is expandable radially away from the respective mandrel arm relative to the longitudinal axis. The core of the convolutely wound web material is disposable about each of the mandrel arms. Further, the at least one expansion element is expandable into contacting and releasable engagement with the portion of the convolutely wound web material forming the hollow core. The convolutely wound web material is fixably and releasably disposed about each of the mandrel arms.

The present disclosure also provides for an end effector for a robot. The end effector comprises a mandrel shaft having a longitudinal axis, a plurality of mandrel arms extending from the mandrel shaft, and at least one expansion element disposed upon a respective each of the mandrel arms. The mandrel shaft is capable of rotating about a longitudinal axis. Each of the mandrel arms is disposed and rotatable about the longitudinal axis. The at least one expansion element is expandable radially away from the respective mandrel arm relative to the longitudinal axis.

The present disclosure also provides for a mandrel arm for a mandrel. The mandrel arm comprises at least one expansion element disposed upon a surface of the mandrel arm. The at least one expansion element is expandable radially away from the surface.

DETAILED DESCRIPTION

As will be described in detail, the improved unwind stand 10 described herein may simultaneously deliver a plurality of web materials to downstream manufacturing equipment.

As is to be appreciated, multiple improved unwind stands 10 described herein can be configured to all simultaneously supply web material to a single downstream manufacturing process and/or a plurality of downstream manufacturing processes. The improved unwind stand 10 described herein may be positioned in a manufacturing environment proximate to other manufacturing apparatuses. While no particular downstream equipment is shown, it will be understood that the continuous webs of web material supplied by the improved unwind stand 10 could be advanced to a variety of web material handling processes, including without being limiting, laminating operations, printers, embossing operations, slitting, folding and cutting operations, converting operations, and combinations of these.

Figure 7:
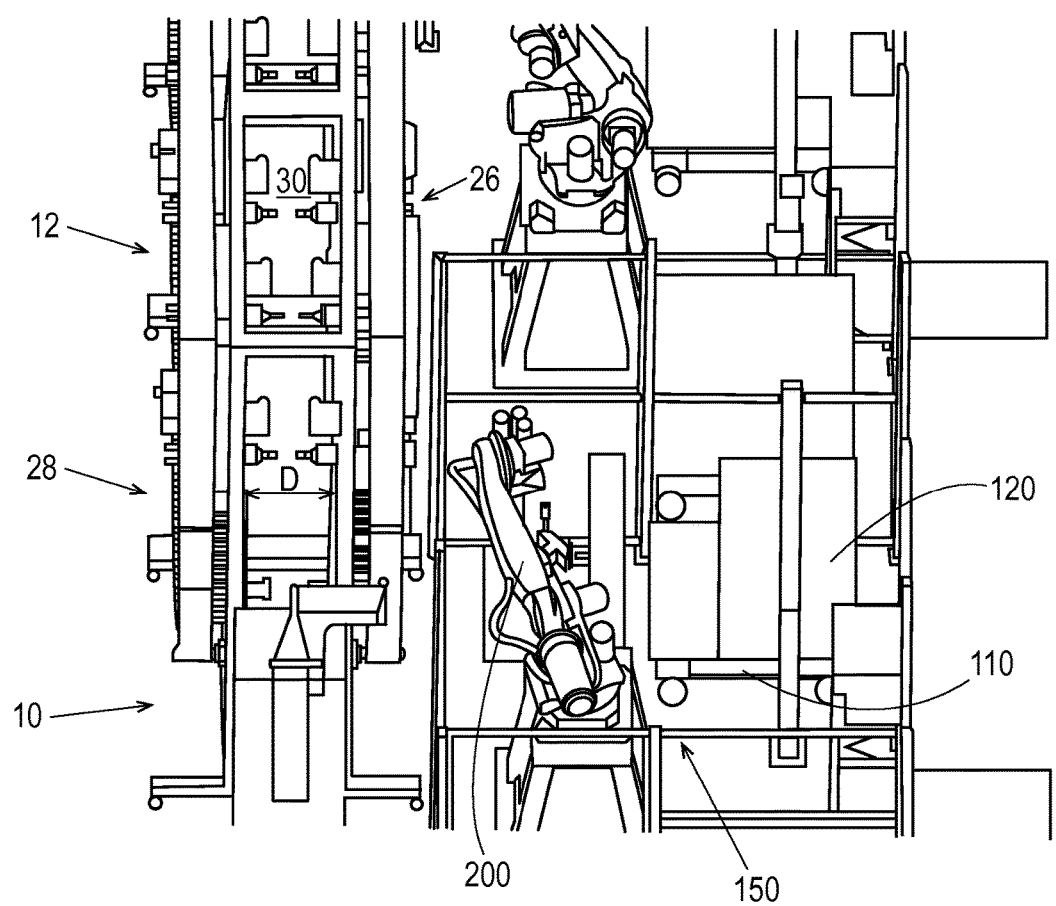
FIG. 7 is a perspective view cross-sectional view of the of the exemplary improved unwind stand of FIG. 5.

One embodiment of the improved unwind stand 10 is illustrated in FIGS. 1-7. FIGS. 1-6 are perspective views of the improved unwind stand 10 in accordance with one non-limiting embodiment. FIG. 7 is a cross-sectional view of the improved unwind stand 10 in accordance with one non-limiting embodiment. The improved unwind stand 10 is provided with a frame 12. The frame 12 includes various components, such as structural supports and plates. For example, the frame 12 may include a plurality of faceplates 14. The faceplates 14 may be fastened to a support member 16 of the frame 12, for example. The frame 12 may include at least one cross-support member 18. The frame 12 can be provided as generally sectional, with three sections 20a, 20b, and 20c. It would be appreciated by one of skill in the art that other embodiments may comprise more or less sections. Furthermore, the sections may be arranged horizontally (as illustrated) or in a vertically arrangement, or a combination of both. The improved unwind stand 10 may be manufactured from any suitable materials, such as steel, stainless steel, aluminum or composite materials, for example. The improved unwind stand 10 may also be assembled or constructed using any suitable techniques, such as welding, rivets, adhesives, or screws, for example.

The improved unwind stand 10 may include a plurality of feet 22 arranged proximate the bottom side. As will be appreciated, the plurality of feet 22 may be adjustable in order to adjust the elevation of the improved unwind stand 10. The improved unwind stand 10 may allow for transport of an improved unwind stand 10. Furthermore, the improved unwind stand 10 may comprise a cable tray for housing various power and communication cables. Other techniques may be used for housing the cables, such as conduits, for example.

As shown, the improved unwind stand 10 is generally rectangular. In various embodiments, other configurations may be used, such as a cube shape or a triangular shape, for example. The improved unwind stand 10 may have a plurality of faces, including a first face 26 and a second face 28. As illustrated, the first face 26 and the second face 28 may be laterally opposed and separated by a distance D. In various embodiments, distance D may be in the range of about 3 feet to 8 feet or less. A cavity 30 may be defined intermediate the first face 26 and the second face 28. As shown, while the cavity 30 is illustrated as being generally rectangular, it is to be appreciated that the cavity 30 may be a variety of shapes and may largely depend on the relationship of the various faces. For example, if the frame 12 is triangular, the cavity 30 may be generally triangular as well. The cavity 30 may be generally enclosed by the various plates 14 of the improved unwind stand 10. In order to provide access to components and equipment within the cavity 30, the improved unwind stand 10 may have at least one cavity access port. Furthermore, a door may be mounted in the cavity access port to control access to the cavity 30.

It is preferred that any door be sized to allow a person to enter the cavity 30. Various embodiments may comprise a plurality of doors and a plurality of cavity access ports.

Figure 4:
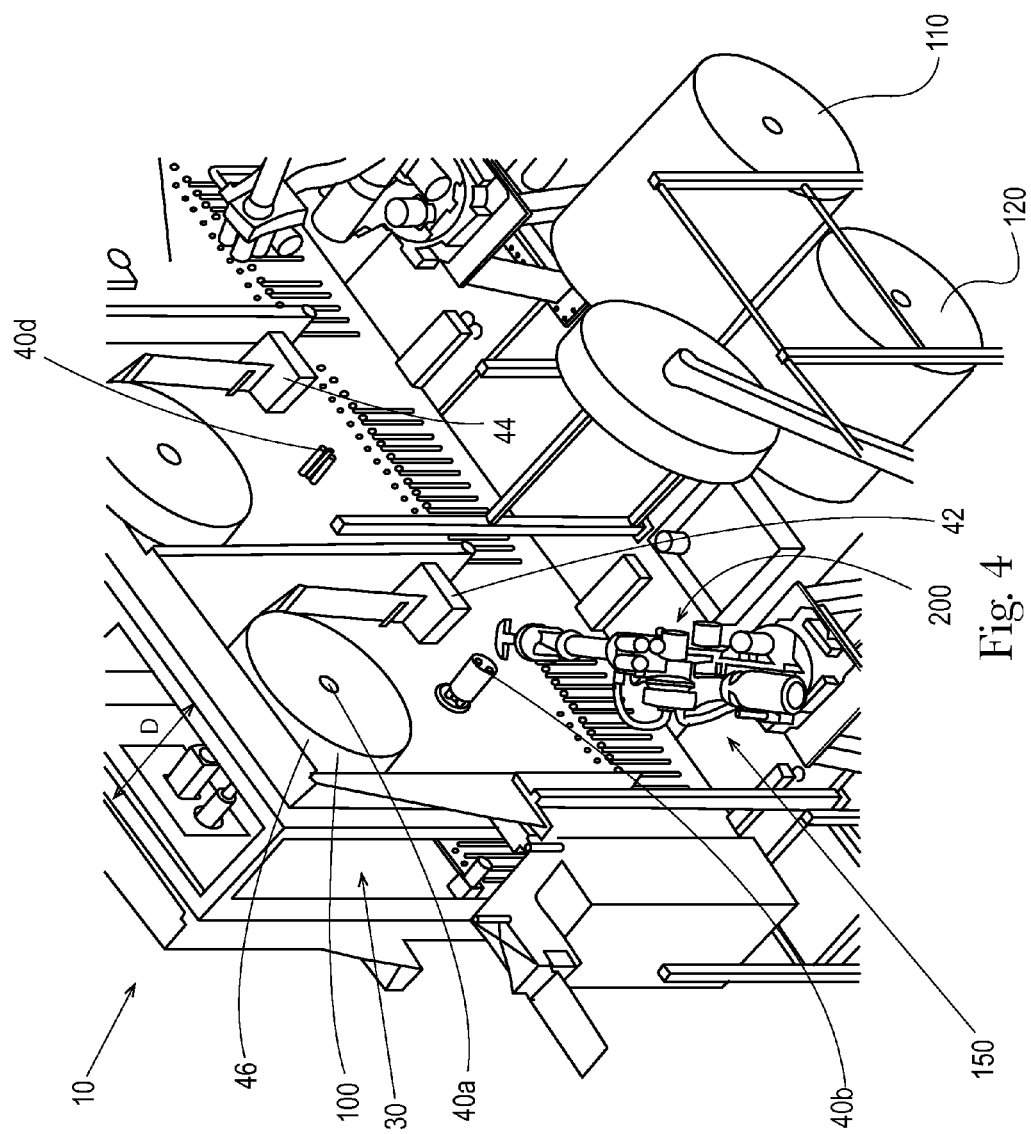
FIG. 4 is a perspective view of the exemplary improved unwind stand showing the positionable roll grasping apparatus in the form of a robot engaging the core remaining from a spent convolutely wound roll of web material disposed upon a mandrel of the unwind stand.
Figure 5:
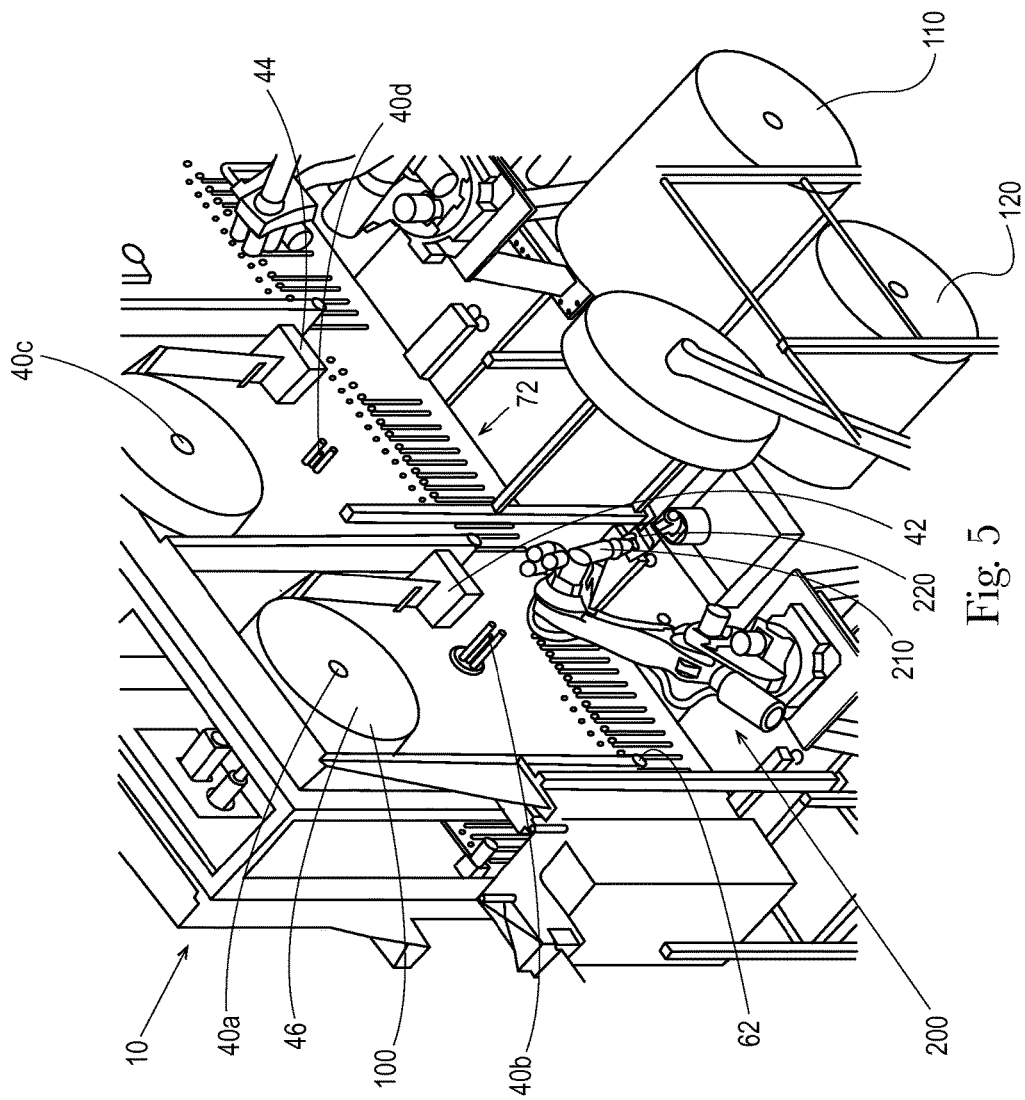
FIG. 5 is a perspective view of the exemplary improved unwind stand showing the positionable roll grasping apparatus in the form of a robot removing the core remaining from a spent convolutely wound roll of web material disposed upon a mandrel of the unwind stand.
Figure 6:
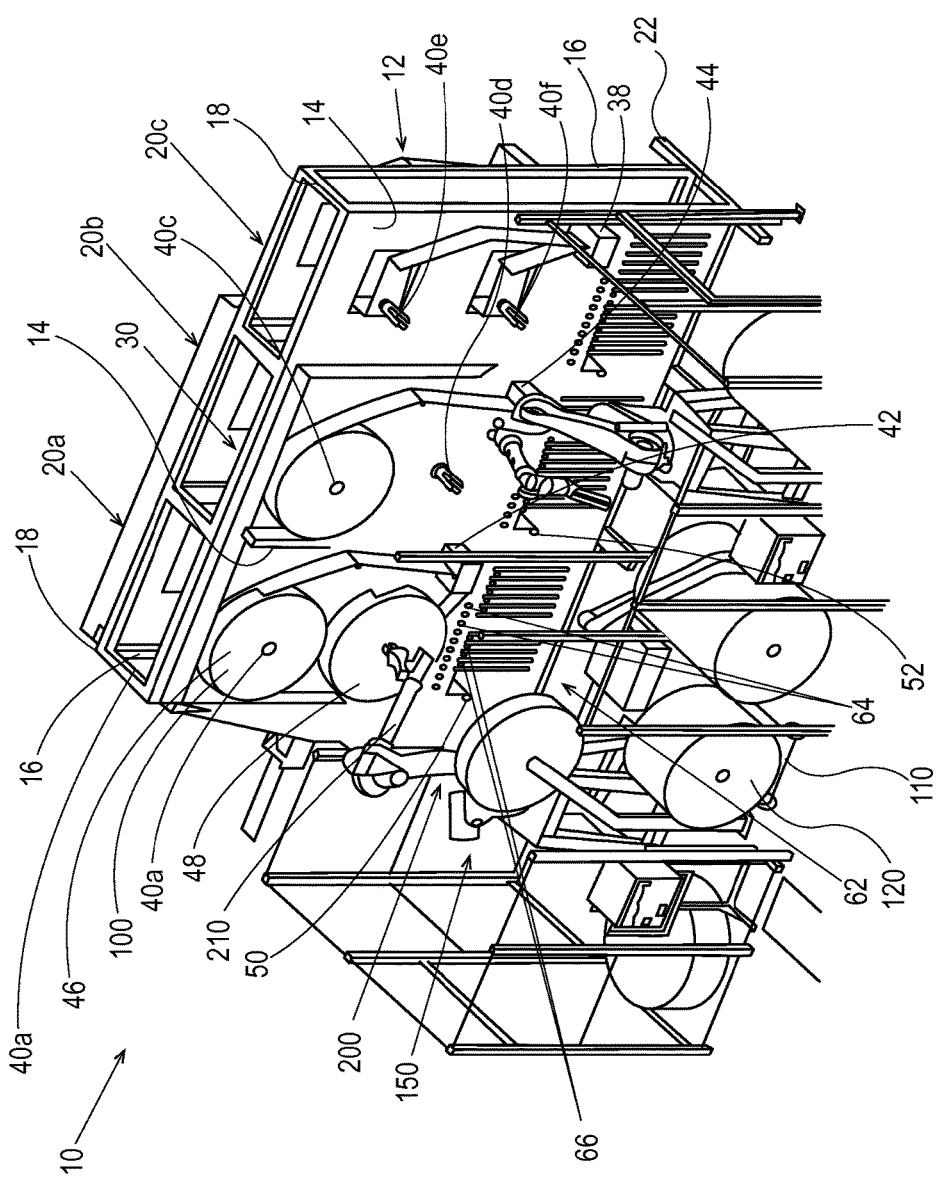
FIG. 6 is a perspective view of the exemplary improved unwind stand showing the positionable roll grasping apparatus in the form of a robot engaging a convolutely wound roll of web material onto an empty mandrel of the unwind stand.

The improved unwind stand 10 may comprise a plurality of mandrels 40a, 40b, 40c, 40d, 40e, 40f extending from a face of the improved unwind stand 10, such as the first face 26. The mandrels 40a, 40b, 40c, 40d, 40e, 40f may extend generally perpendicular to the first face 26, or may be positioned at any other suitable angle. In some embodiments, the improved unwind stand 10 includes a first splicer 42, and some embodiments may also include a second splicer 44. The first splicer 42 and the second splicer 44 may be positioned on the improved unwind stand 10 in any suitable location, such as in between a pair of mandrels. As illustrated in FIG. 4, the first splicer 42 may be configured to receive a web material 46 and a web material 48. Similarly, the second splicer 44 may be configured to receive a web material 46 and a web material 48.

The improved unwind stand 10 may further comprise a first dancer 50, and, if needed, a second dancer 52. The first dancer 50 may comprise an arm 54 that is mounted to the frame 12. The first dancer 50 may also comprise a first lattice 62. The first lattice 62 may comprise a plurality of rollers 64 and a complimentary plurality of rollers 66 mounted to the frame 12. As is to be appreciated, the number of rollers 64, 66 in the first lattice 62 may vary depending on the type of web material being fed through the first lattice 62 and the feed speed of the web material 46, 48. The second dancer 52 may have similar components. Similar to the first dancer 50, the second dancer 52 may comprise a second lattice 72 comprises a plurality of rollers 74 and a plurality of rollers 76 mounted to the frame 12. The number of rollers in the first lattice 62 may differ from the number of rollers in the second lattice 72, as the number of rollers used is based on characteristics of the web material being fed through the lattices 62, 72, such as web material 46, 48.

In some embodiments, the improved unwind stand 10 may comprise a first and second metering rolls. The first and second metering rolls may be driven by an actuator to establish a line speed and/or line tension of the web material. The improved unwind stand 10 may further comprise a plurality of mandrels 40 (also known as "spindles") and/or idler rollers to engage and direct the web material. As is to be appreciated, the various spindles may rotate relative or may be fixed. The various mandrels 40, spindles, and metering rolls may be powered by any motive force known in the art, collectively referred to herein as "actuators." Power sources include, without being limiting, standard and servo electric motors, air motors, and hydraulic motors. The power source may be coupled to any rotating components of the improved unwind stand 10 by any power transfer means known in the art, such as direct coupling the actuator to the rotating component, driving the rotating component through the use of chains and sprockets, belts and sheaves, and gearing, for example.

In one embodiment, the actuators can be operably engaged to each mandrel 40a, 40b, 40c, 40d. In other embodiments, however, a single actuator may be used to drive a plurality of mandrels. The actuators may extend into the cavity 30 of the improved unwind stand 10. Various power and communication cables may be attached to the actuators inside the cavity 30.

In one embodiment, a roll 100 of the first web material 46 maybe mounted on the mandrel 40a. The roll 100 may be rotatable in either a clockwise and/or counter clockwise direction. The web material 46 may be unwound from the roll 100 and fed into and pass through the splicer 42. Once passing through the splicer 42, the web material 46 may enter the first lattice 62. As illustrated, the web material 46 may be looped over a roller 66 and then extend to a roller 64. The web material 46 may then extend between a series of complimentary rollers in the first lattice 62 thereby forming a "festoon."

As will be appreciated upon consideration of this disclosure, when the arm moves (or pivots) the distance between the rollers 64 and the rollers 66 increases, thereby increasing the linear amount of the web material 46 engaged in the first lattice 62. Additionally, the number of rollers 64, 66 used in the first lattice 62 will also determine the linear amount of the web material 46 engaged in the first lattice 62. After passing through the first lattice 62, the web material 46 may proceed in the machine direction towards the first metering roll. After engaging with first metering roll, the web material 46 may be directed toward downstream equipment.

A roll 104 of the web material 48 maybe mounted to the mandrel 40b. The roll 104 may be configured to rotate in a clockwise and/or counterclockwise direction. In the illustrated embodiment, the roll 104 serves as a stand-by roll for the splicer 42, and therefore the web material 48 may be the same type of the web material as 46. In some embodiments, it may be advantageous to provide web material 48 as a different web material that web material 46 in order to allow for the ability to rapidly change web material types without having to actually remove the given web material before changing over to different product constructions. In other embodiments, however, the roll 104 may bypass the splicer 42 and/or may be a different web material than web material 46. As used herein, splicing (and splicing means) refers to any process of joining, or any apparatus or equipment associated with or necessary to join, a first web material to a second web material, such as joining the web material 46 from roll 100 to the web material 48 from the roll 104. As used herein, a splice is considered to be the combined localized portions of a first web material and a second web material that are joined together.

Web material 46, 48 that may be spliced (with splicing means) can include, without being limiting, non-woven materials, paper webs including tissue, towel and other grades of paper, absorbent materials, plastic films and metal films. The splicer 42 may be adapted to splice the web material of any suitable width and thickness. Web material ranging in width from a few millimeters to about several meters may be processed by an appropriately sized splicing apparatus. Similarly, web material ranging in thickness from a few thousandths of a millimeter to several millimeters may be spliced by an appropriately adapted splicer 42.

It should be understood that first and second web materials 46, 48, such as thermoplastic material, can be added to the line operation in an alternating fashion in the above described manner whenever a low roll amount is detected, thereby allowing the line to run continuously. It should also be understood that while the method and apparatus of the present invention have been described with reference to first and second web materials, it is intended that multiple rolls of web materials will be spliced together over time to keep the line running. Further, it is contemplated that the first and second web materials need not be made from the same web material as long as the web materials used for the first and second webs are compatible from a splicing standpoint. Due to the ability to continuously run the line operation according to the teachings of the present invention, products can be manufactured with minimal manufacturing down-time.

First and second lattices may serve has accumulators during a zero-speed splice and may also serve as part of the first and second dancers 50, 52 to alter the line tension of the web materials 46, 48. As is to be appreciated, the improved unwind stand 10 may comprise a variety of sensors to determine roll diameter and material tension for example. A controller, or plurality of controllers, may be used to receive various inputs from the sensors on manufacturing line and the improved unwind stand 10 and make adjustments as needed in a continuous and ongoing fashion. Additional detailed descriptions of various types control methods and apparatii can be found in U.S. Pat. Nos. 6,991,144 and 7,028,940 incorporated by reference herein.

First and second web materials 46, 48 can be provided to the improved unwind stand 10 through means known to those of skill in the art. For example, as shown, first and second web materials 46, 48 can be provided to the improved unwind stand 10 through the use of carts 110. By way of example only, carts 110 can be provided with a quantity of convolutely wound rolls of web material 120 suitable for use as first and second web materials 46, 48.

During operation, the splicer 42 may perform a zero-speed splice of a tail end of the web material 46 on roll 100 to the beginning end of the web material 48 on roll 104 while simultaneously continuing to deliver the web material 46 to the downstream equipment. During a splicing operation, the arm 54 may move in order to serve as an accumulator and increase the linear amount of the web material 46 engaged in the first lattice 62. When the roll 100 stops spinning, the arm moves or pivots and the web material 46 is drawn out of the first lattice 62 to supply the downstream equipment. Therefore, the splicer 42 may splice the web material 46 to the web material 48 while the rolls are stopped, yet the web material 46 continues to be delivered from the improved unwind stand 10 to downstream equipment without disruption. Once the splice has been performed, the mandrel 40b may be rotated by an actuator to unwind the web material 48 from the roll 104. As will be appreciated, once the web material 48 is unwinding from the roll 104 and supplying web material to the downstream equipment, a replacement roll may be loaded onto mandrel 40a, with material from that replacement roll fed into the splicer 42 and positioned to serve as a standby roll.

The splice between the web material 46 and the web material 48 may be accomplished by any means known in the art. The nature of the splice may be related to the nature of the particular web material being spliced. In one embodiment two web materials 46, 48 can be spliced together by using two-sided splicing tape having adhesive on each side of the tape. In this embodiment, the two-sided splicing tape is affixed first to one web material 46 and then to a second web material 48. Pressure may be applied to the portion of the two web materials 46, 48 after the application of the two-sided splicing tape. In another embodiment two web materials 46, 48 may be joined by applying an adhesive directly to one web material 46 and then bringing the second web material 48 into contact with the adhesive. Pressure may be applied to the two web materials 46, 48 at the location of the adhesive to assist in the joining of the web materials 46, 48.

In another embodiment two web materials 46, 48 may be brought into a face-to-face relationship and then subjected to sufficient pressure to bond the two web materials 46, 48 together. In this embodiment, the two web materials 46, 48 may be subjected to sufficient pressure to glassine the two web materials 46, 48 creating a bond sufficient to withstand the process tension applied to the spliced web material.

In another embodiment the two web materials 46, 48 may be brought into a face to face relationship and exposed to a bonding means. Bonding means include without being limiting, exposure to infra-red or other electromagnetic radiation to heat and fuse the web materials 46, 48, ultrasonic energy applied from an appropriately adapted ultrasonic horn to the combined web material against an anvil to heat and fuse the web materials 46, 48 together, and the spray application of a solvent to fuse the web materials 46, 48.

In one embodiment, the improved unwind stand 10 may support additional rolls, such as additional roll 112. In various embodiments, additional roll 112 may be configured to operate substantially similar to rolls 100, 104. For instance, additional roll 112 may serve as a supply roll or as a stand-by roll. While rolls 100, 104, 112, 120 are shown, it is to be appreciated that more or less rolls may be used in various embodiments. For example, some embodiments of the improved unwind stand 10 may include additional vertical sections to accommodate an additional roll or additional rolls. Furthermore, in various embodiments, the improved unwind stand 10 may include mandrels on other faces that are configured to receive rolls of web material. In one embodiment, the second face 28 may comprise a set of mandrels. Rolls of web material may be mounted on these mandrels and during operation downstream equipment may be continuously fed with web material from at least one of the rolls. It is to be appreciated that in some embodiments the second face 28 of vertical section 20c may comprise at least one mandrel configured to receive a roll of web material. Further, in some embodiments, the second face 28 of vertical section 20c may comprise at least two mandrels, with each mandrel configured to receive a roll of web material. Additionally, the second face 28 of vertical section 20c may comprise a splicer, similar to splicer 42, for example.

In an exemplary but non-limiting embodiment, a unique feature of the improved unwind stand 10 is the use of a positionable roll grasping apparatus 150 which can be provided in the form of a robot 200 to move, relocate, and otherwise provide the various first and second web materials 46, 48 to the improved unwind stand 10. It would be understood by one of skill in the art that robot 200 capabilities generally range from simple repetitive point-to-point motions to complex motions that can be computer controlled and sequenced as part of the improved unwind stand 10. While positionable roll grasping apparatus 150 is provided in exemplary, non-limiting form herein as a robot 200 herein, one of skill in the art will appreciate that positionable roll grasping apparatus 150 could be provided in other forms such as a series of connected mechanical linkages, autonomous devices, and the like.

The robot 200 can be provided with an arm 210, a wrist subassembly 220 and an end effector 230. An exemplary robot 200 could utilize a Cartesian, cylindrical, polar, or revolute coordinate system to coordinate motion relative to the improved unwind stand 10, the various first and second web materials 46, 48, as well as the components cooperatively associated thereto. One of skill in the art will recognize that generally, three motion axes are employed to deliver the wrist subassembly 220 anywhere within the sphere of influence and three additional motion axes are employed for universal orientation of the end effector 230. A drive system can be used for each motion axis, and without limitation the drive system can be electrical, hydraulic or pneumatic.

The robot 200 represented in the drawings consists of a mount 205, a rocker 215, an extension arm 210, a wrist subassembly 220, as well as an end effector (also called a robot hand) 230 and can be provided with as many as six or seven rotary axes. Alternatively, the robot 200 can be arranged in any position, whereby it is, for example, mounted to a support, suspended at a portal, or can be attached to the frame 12. The axes are different with respect to the swinging and rotating axes, whereby the swinging axes in the robot 200 run crosswise to the extension of the robot 200 structure, and as a rule, horizontally. The swinging angles are for the most part also limited. The rotational axes generally extend lengthwise to the respective robot structure or in the vertical plane. They permit as a rule greater rotational angles than the swinging axes. Further, rocker 215 can rotate around one or several axes.

Robot hand 230 can be constructed with respect to the kinematics required to move convolutely wound rolls of web materials 46, 48 from a first location to a second location. This may require moving the wound web materials 46, 48 from a first location where the wound web materials are stored to a second location that places the web materials proximate to, or in contacting engagement with frame 12, any of the mandrels 40a-40v, or placing the web material comprising wound web materials 46, 48 proximate to or in contacting engagement with, first, second, or third splicers 42, 44, 38. For that matter, robot hand 230 can move wound web materials 46, 48 into any position or location that provides the wound web material 46, 48 in the most efficacious position required to manufacture the articles envisioned.

Additionally, it is envisioned that robot hand 230 can be constructed with respect to the kinematics required to remove the cores upon which the convolutely wound rolls of web materials 46, 48 are wound about from contacting engagement with any of the mandrels 40a-40v disposed upon frame 12. It is also envisioned that robot hand 230 can be provided as a centrally constructed articulating hand. This can provide the robot hand 230 with the three continuous and interlaced axes of rotation (movement). This may require providing as many drive shafts axes that extend inside the housing of extension arm 210. Each drive shaft can be directly attached to a respective motor with cardan links. Such a robot 200 can facilitate the placement of sequential robots 200 arranged directly next to one another with minimal distance and an ability to operate separately without mutually hindering each other.

Additionally, it is envisioned that robot 200 and/or robot hand 230 can automatically and/or autonomously determine any characteristic of a roll of web material such as the diameter of a roll of web material (e.g., first web material 46), the diameter of a core region of a roll of web material, the type of material comprising a roll of web material, a physical characteristic of a roll of web material, or the like through computer control or programming as would be available to one of skill in the art. It is believed that such a determination could be beneficial in allowing the robot 200 to automatically and/or autonomously select an appropriate end effector 230 provided from a selection of available end effectors 230. By way of non-limiting example, if the roll grasping apparatus 150 provided as robot 200 (or any ancillary component of roll grasping apparatus 150) determines that a particular roll of web material (e.g., first web material 46) has a diameter of 1 meter and a core diameter centrally disposed thereto has a diameter of 10 cm, any control software, programming, or other PLC code could direct the robot 200 to obtain an appropriately sized end effector 230 from a store of end effectors 230. Alternatively, if robot 200 has a particular end effector 250 disposed thereon and the control software, programming, or other PLC code determines that an end effector 250 disposed upon robot 200 is incorrectly sized for the roll of web material, the control software, programming, or other PLC code could direct the robot to return the end effector 250 currently disposed thereon to a store of end effectors 250 and select a new and/or appropriate end effector 250 for the particular roll of web material. It is believed that such an ability to change end effectors 250 'on-the-fly' would necessarily increase the flexibility of a manufacturing process as well as decrease the amount of time needed to change production of articles from one type requiring one type of web material to another.

Figure 1:
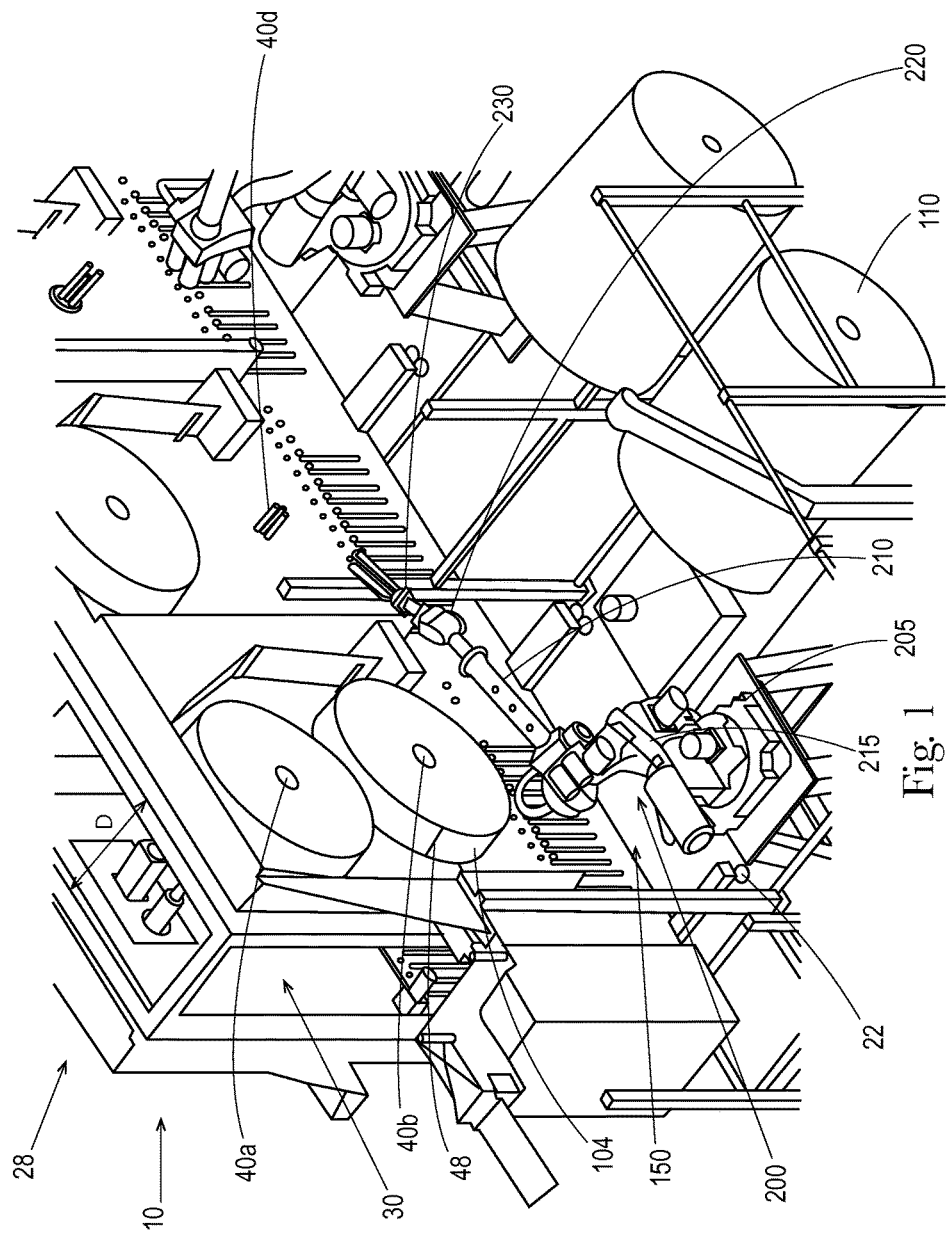
FIG. 1 is a perspective view of an exemplary improved unwind stand showing according to the present disclosure.
Figure 2:
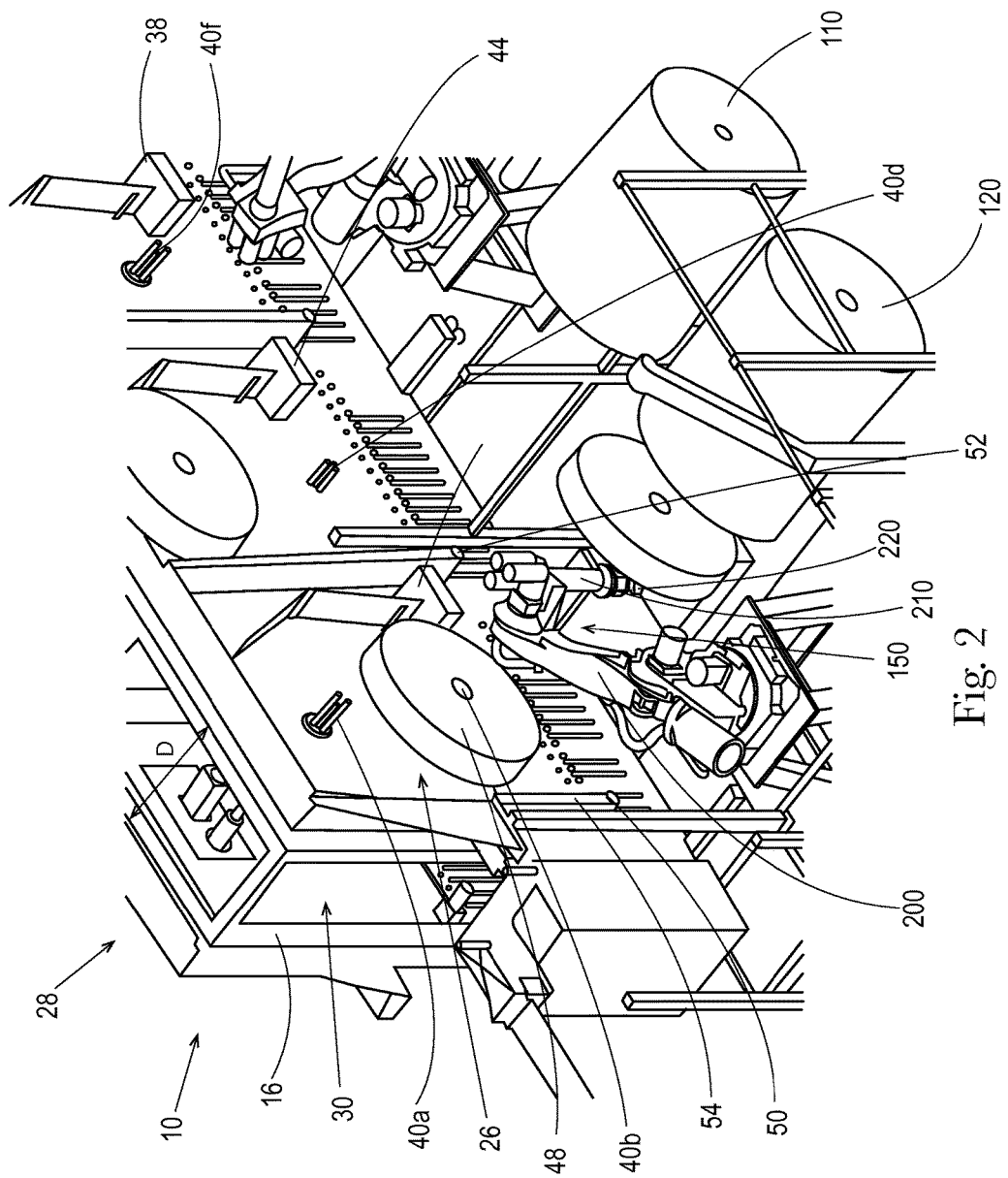
FIG. 2 is a perspective view of the exemplary improved unwind stand showing the positionable roll grasping apparatus in the form of a robot engaging a convolutely wound roll of web material that is to be loaded onto a mandrel of the unwind stand.
Figure 3:
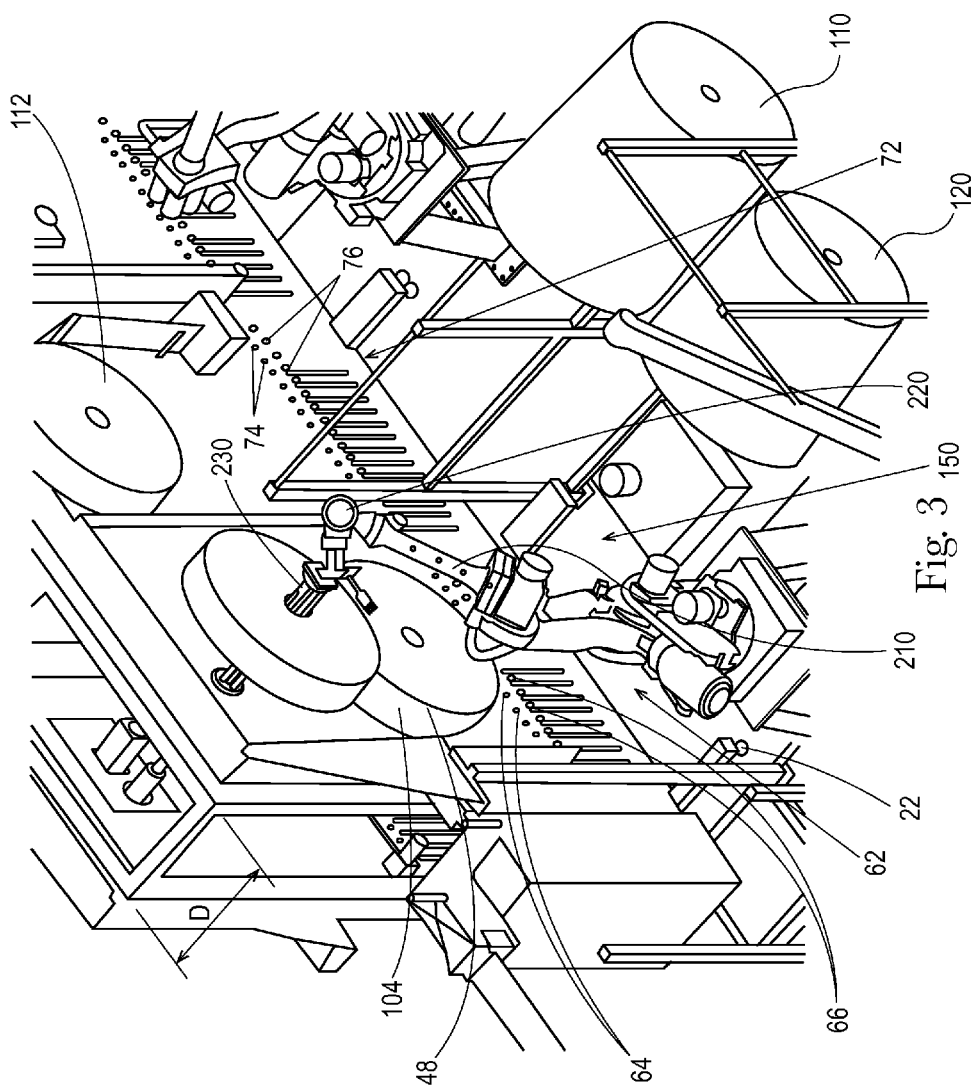
FIG. 3 is a perspective view of the exemplary improved unwind stand showing the positionable roll grasping apparatus in the form of a robot engaging a convolutely wound roll of web material onto a mandrel of the unwind stand.

More particularly, as shown in FIG. 1, a six-axis industrial electric robot 200 which is illustrative of a wide variety of robots that can be operated in accordance with the principles of the present disclosure. An exemplary robot 200 suitable for use with the present disclosure as positionable roll grasping apparatus 150 is the model KR180L available from Kuka Robotics. By way of non-limiting example, the model KR180L has a 50-60 Kg payload capacity. The Model KR210L has an 80-90 Kg payload capacity and the model KR240L having a payload capacity of 110-120 Kg can also be suitable for use. Such robots 200 can be particularly suited for precise, repetitive tasks.

In a preferred embodiment, positionable roll grasping apparatus 150 (provided as robot 200) is provided in a configuration that is not in connective engagement with frame 12. In other words, positionable roll grasping apparatus 150 (provided as robot 200) can be provided with a support assembly for mount 205 that is not physically attached to frame 12, but is still capable of providing first and second web materials 46, 48 in cooperative and connective engagement with any of the components of the improved unwind stand 10. This can include frame 12, first and/or second splicers 42, 44, mandrels 40a-40v, first and/or second dancers 50, 52, first and second metering rolls, or any of the mandrels 40 and idler rollers disposed upon frame 12. Each axis of motion of robot 200 can be generated by a brush type DC electric motor, with axis position feedback generated by incremental encoders. By way of example only, robot 200 and the wrist subassembly 220 can be provided with any number of articulations, including an up/down rotation, a left/right rotation, a third motion, up and down elbow and shoulder rotations, and a left/right arm rotation on the base of robot 200.

As would be understood by one of skill in the art, control software can suitably operate the positionable roll grasping apparatus 150 (provided as robot 200) by incorporating absolute position feedback. A suitable robot 200 control scheme can utilize a digital servo control. For example, each robot 200 can be operated with a torque control loop. A position control loop can be connected to a velocity control loop which in turn can drive the torque control loop. A feed-forward acceleration control loop that is responsive to an acceleration command as well as arm and load inertia sensors can be directly coupled to the input of the torque control loop. Additionally, the robot 200, arm 210, rocker 215, wrist subassembly 220, and end effector (hand) 230 can be operated by the control loop in accordance with a robot program through a stream of program position commands applied to the position control loop. In any regard, it can be preferable to implement such a control loop as a digital control.

A preferred control loop arrangement could provide position and velocity control loops and to be parallel fed to the input of a torque control loop. Velocity commands can be generated from position commands. In turn, feed-forward acceleration commands can be generated from the velocity commands. Computed inertia (arm 210, rocker 215, wrist subassembly 220, end effector 230, and the applied load) can be multiplied against the acceleration command in the feed-forward acceleration control loop.

A velocity command generator can interpolate velocity commands which correspond with the velocity feedback sampling rate in a velocity feedback path. Similarly, in a position control loop, an interpolator can generate position commands in correspondence with a feedback path. Velocity error can be generated by a summer with gain applied by a loop. Similarly, a position error can be generated by a summer. Velocity and position errors and feed-forward acceleration command can be summed in a summer. Gain can be applied to generate a torque command that is applied to the input of a torque control loop. The torque error can generated in a summer by summing the torque command (motor current command) with current feedback and applying a torque loop gain to the torque error and output commands (motor voltage commands) that supplies the motor drive current for robot 200 joint operation.

It is believed that end effector (robot hand) 230 can be provided with a unique device that provides for the ability to transfer convolutely wound rolls of web materials without the need for compressional forces applied to the external convolutions of the wound web materials.

Because of the compressible nature of the web materials, it is quite common for parent rolls to become out-of-round. Not only the soft nature of the web material, but also the physical size of the rolls, the length of time during which the rolls are stored, how the rolls are stored (e.g., on their end or on their side), and the fact that 'roll grabbers' commonly used to transport these rolls clamp the roll generally about the circumference all can contribute to this problem. As a result, by the time many rolls are placed on an unwind stand for converting, they have changed from the desired cylindrical shape to an 'other-than-round' (e.g., out-of-round) shape.

In extreme cases, rolls can become oblong, assume an 'egg-like' shape, or even resemble a flat tire. But, even when the roll is only slightly out-of-round, there are considerable problems. In an ideal case, as material is removed from a completely round, convolutely wound roll, the feed-rate, web velocity, and tension will generally be consistent. However, process disturbances such as the feed-rate variability, web velocity variability, and tension variability for an out-of-round, convolutely wound roll, caused by the shape changes created by the storage and handling of rolls, will likely vary the material removal from the ideal web speed of a completely round roll depending upon the position and/or radius at the web takeoff point at any moment in time.

If the rotational speed of the roll remains substantially constant, the feed-rate, web velocity, and tension of the web material coming off of an out-of-round roll will vary during any particular rotational cycle. Naturally, this depends upon the degree to which the roll is out-of-round. Since the paper converting equipment downstream of the unwind stand is generally designed to operate based upon the assumption that the feed-rate, web velocity, and tension of web material coming off of a rotating roll is generally consistent with the driving speed of the roll, web velocity, and/or tension spikes, and/or slackening during the unwinding process can cause significant problems. With an out-of-round roll, such process disturbances cause the instantaneous feed-rate, web velocity, and/or tension of the web material to be dependent upon the relationship at any point in time of the radius at the drive point and the radius at the web takeoff point.

Clearly, there is a need to overcome this problem of causing out-of-round convolutely wound rolls of web material. Particularly, out-of-round rolls create variable web feed rates and corresponding web tension spikes and web tension slackening that have required that the unwind stand and associated paper converting equipment operating downstream thereof be run at a slower speed. In many instances this creates an adverse impact on manufacturing efficiency. Providing an end effector 230 as discussed herein can obviate these aforementioned drawbacks.

Figure 11:
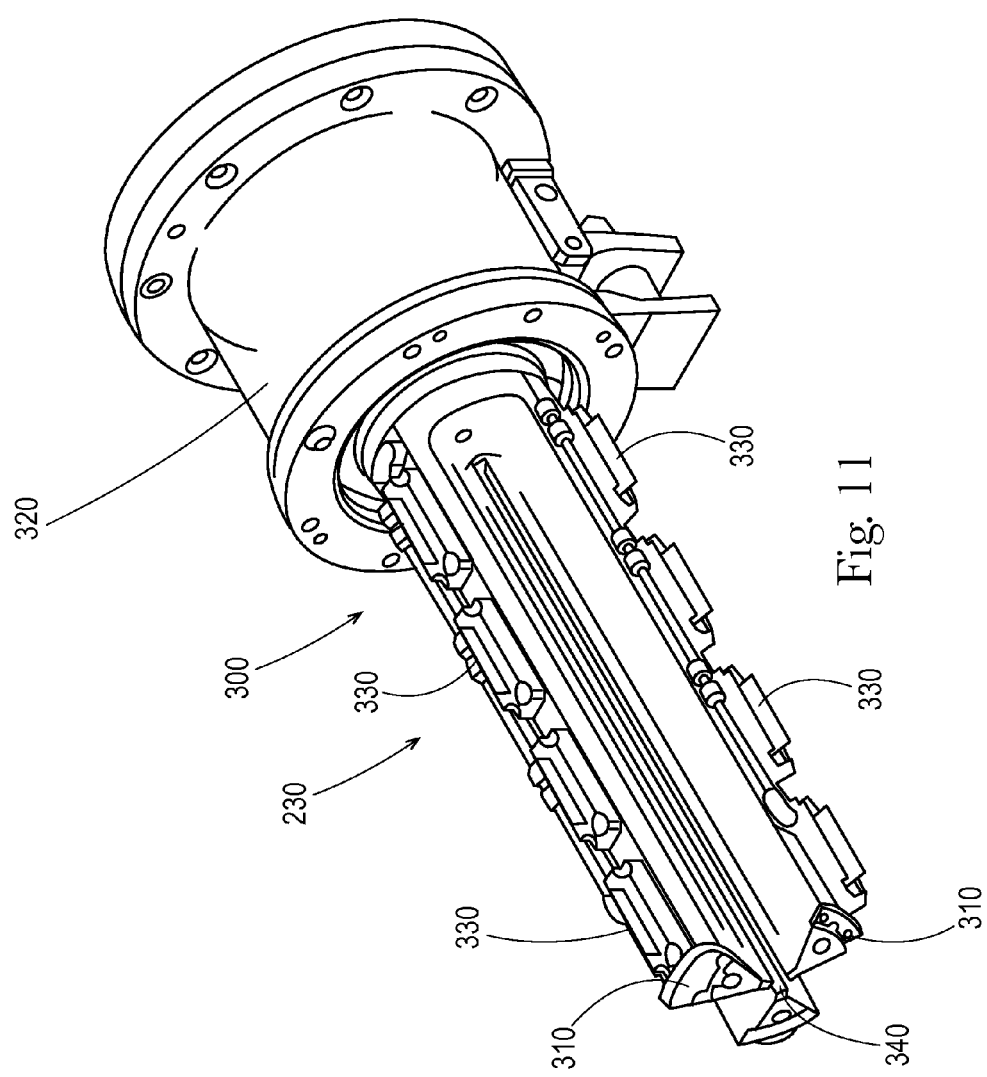
FIG. 11 is a perspective view of an exemplary end effector suitable for use with a positionable roll grasping apparatus in the form of a robot of the disclosed unwind stand.
Figure 12:
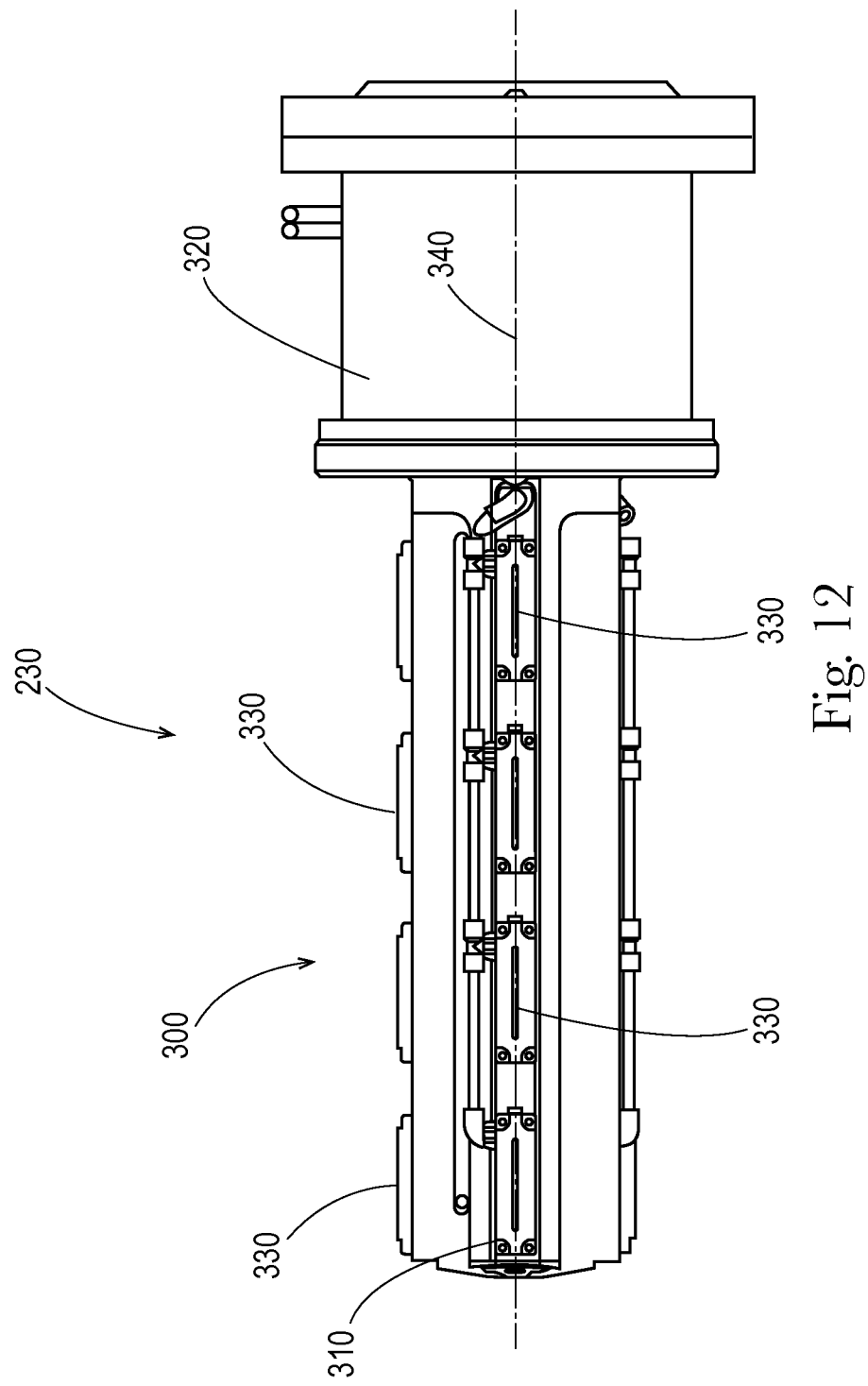
FIG. 12 is an elevational view of the exemplary end effector of FIG. 11.
Figure 13:
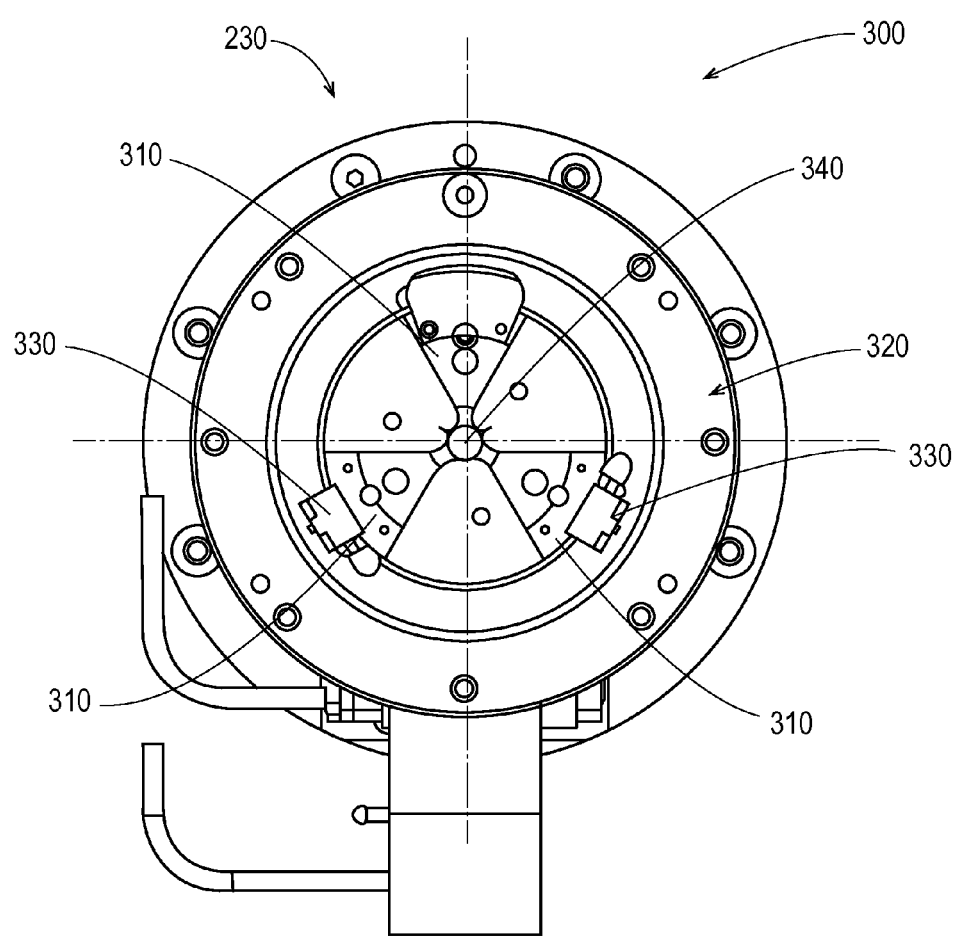
FIG. 13 is a cross-sectional view of the exemplary end effector of FIG. 11.

FIGS. 11-13 provide different perspective, planar, and sectional views of a suitable end effector 230. By non-limiting example, end effector 230 is provided as a mandrel 300 having a plurality of elongate mandrel arms 310 disposed radially about the longitudinal axis 340 of mandrel 300 and extending from mandrel shaft 320. Each mandrel arm 310 is provided with at least one expansion element 330, and in most cases a plurality of expansion elements 330 disposed upon the outer surface thereof. In principle, mandrel 300 is inserted into the hollow core area of a convolutley wound material. The associated expansion elements 330 associated with each mandrel arm 310 are then expanded radially away from longitudinal axis 340. The outward expansion of the expansion elements 310 is limited by the diameter of the hollow core area of the convolutely wound web material. Upon proper expansion of the expansion elements 310 against the hollow core of the convolutely wound web material, a compression fit is realized that effectively provides the end effector 230 having the convolutely wound web material attached thereto to freely move about and position the roll of convolutely wound web material be positioned as may be required.

As depicted, mandrel 300 is provided with three mandrel arms 310 arranged triangularly about longitudinal axis 340. Naturally, one of skill in the art could provide a mandrel 300 with any number of mandrel arms 310 disposed as required about longitudinal axis 340. For example, one of skill in the art could provide only two mandrel arms 310 or even four mandrel arms 310.

One surprising aspect of providing mandrel 300 as a plurality of mandrel arms 310 is the ability to interleave a pair of mandrels 300. In other words, the mandrels arms 310 of opposed mandrels 300 can be disposed in an adjoining relationship so that the mandrel arms 310 of interlaced mandrels 300 are disposed radially and cooperatively about longitudinal axis 340 and in cooperative engagement with each other. A surprising benefit of such interleaving is the ability to effectively transfer a convolutley wound roll of web material disposed and locked upon a first mandrel 300 to be transferred to a second mandrel 300 upon the inter-engagement of the mandrel arms 310 of a first mandrel 300 and the mandrel arms 310 of a second mandrel 300.

Figure 14:
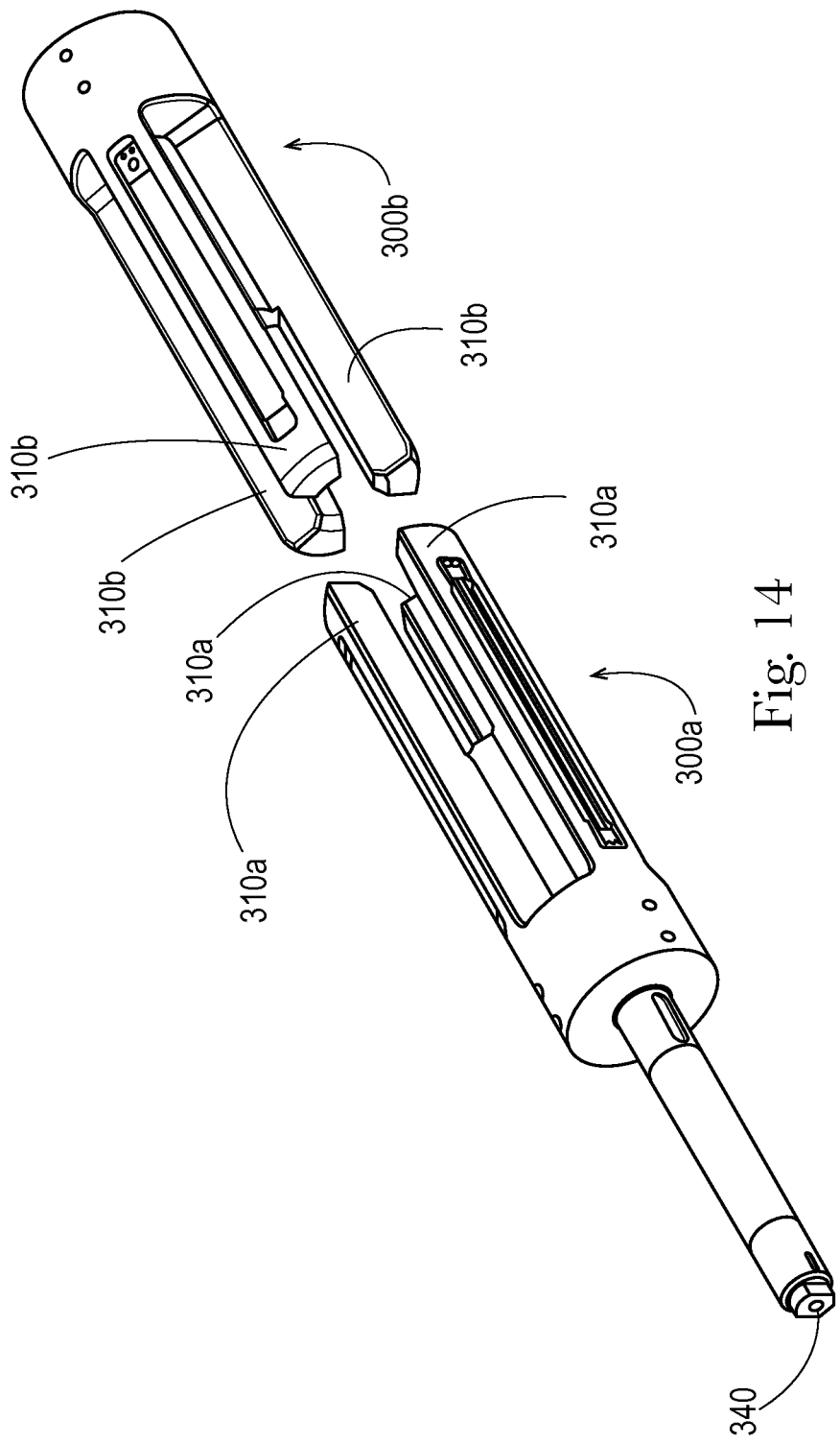
FIG. 14 is a perspective view of another exemplary end effector in proximate contact with a second end effector.
Figure 15:
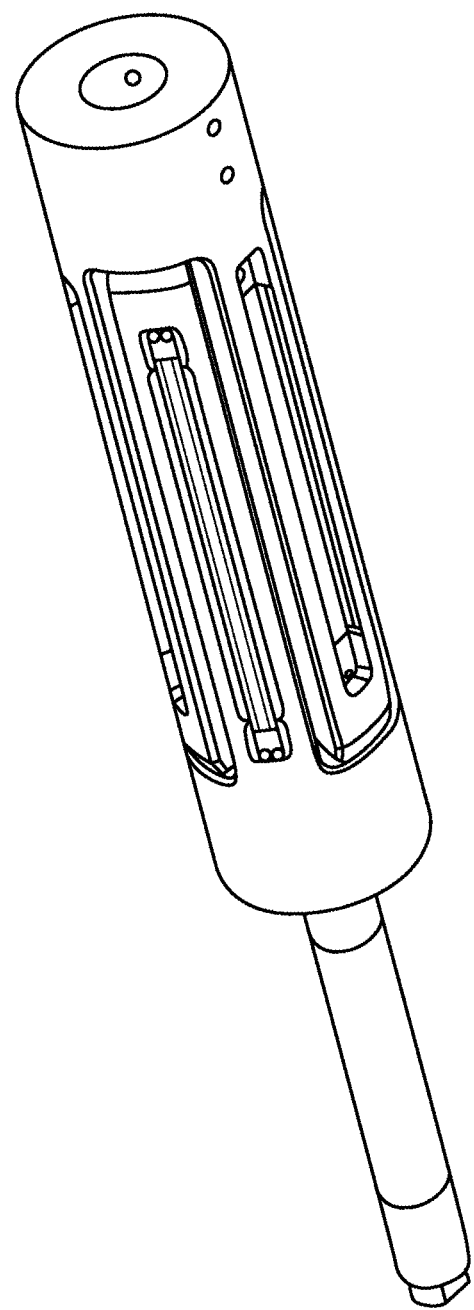
FIG. 15 is a perspective view of the exemplary end effectors of FIG. 14 in interleaved and contacting engagement.

As shown in FIGS. 14-15, opposed mandrels 300a, 300b and their respective mandrel arms 310a, 310b can be positioned into an interengageable, opposing, interlocking fashion. Such interengageable, opposing, interlocking orientation can allow for the mandrel arms 310a to be disposed adjacent mandrel arms 310 about longitudinal axis 340 when mandrel 300a is positioned coextensively with mandrel 300b.

As shown in FIG. 15, each of the mandrel arms 310b of mandrel 310b can be positioned into the region disposed between adjacent mandrel arms 310a of mandrel 300. Thus, if a convolutely wound roll of web material were disposed upon mandrel 300b so that it was disposed about the horizontal axis 340b and in contacting and locking engagement with expansion elements 330b disposed within each mandrel arm 310a, the mandrel arms 310b of mandrel 300b could be interlaced with the mandrel arms 310a of mandrel 300a so that a designated mandrel arm 310b is disposed between two adjacent mandrel arms 310a of mandrel 300a. If the expansion elements 330a disposed upon the respective mandrel arms 310a of mandrel 300a are kept in an unexpanded condition, both mandrel 300a and mandrel 300b and the associated mandrel arms 310a, 310b can be coextensively disposed within the core of the convolutley wound web material.

Thus, it would be possible during this coextensive and condition of interlocking engagement to expand the respective expansion elements 330a of mandrel 300a and contract the respective expansion elements 330b of mandrel 300b. This would clearly and effectively provide for the transfer of the roll of convolutley wound web material from mandrel 300b to mandrel 300a.

It is believed that the respective expansion elements 330 can be expanded and contracted though the use of appropriate valving and fluid supply. Suitable fluids could be provided as a hydraulic control system or an air control system. In certain cases, it may be suitable to provide valves that can control and/or direct the flow of fluid to control a particular expansion element 330 or plurality of expansion elements 330 as may be required by the user. In any regard, it is preferred that the expansion elements 330 be expandable to the point of contacting engagement with the material defining the outside of the hollow core of the convolutley wound web material. The amount of contacting engagement should be sufficient to allow for the mandrel 300 provided as an end effector 230 of robot 200 or provided as a mandrel 40 disposed upon frame 12 of unwind stand 10 to allow the end effector 230 or mandrel 40 to effectively position or unwind the roll of convolutely wound web material without loss of control of the convolutely wound web material.

Figure 8:
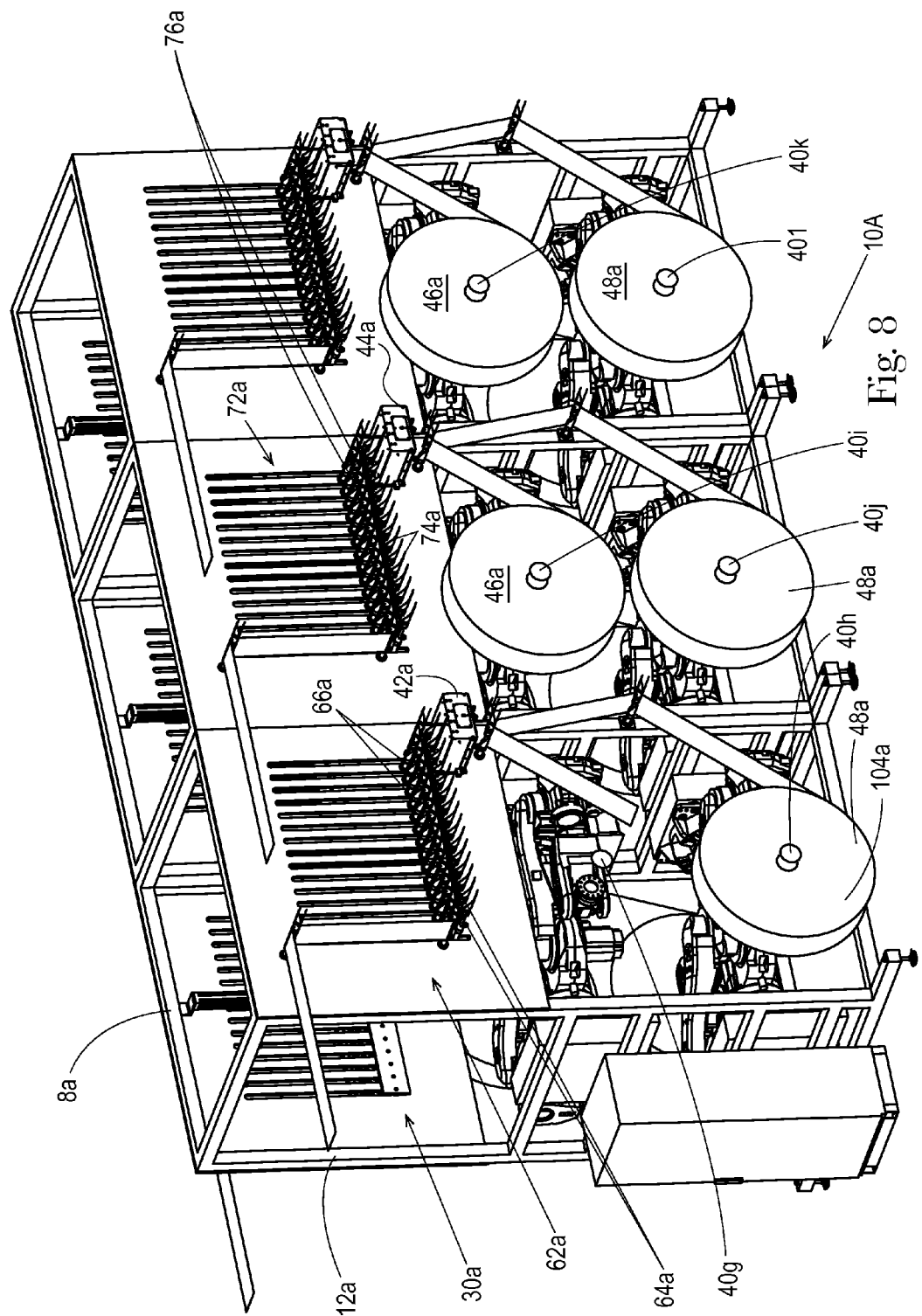
FIG. 8 is a perspective view of an alternative embodiment of exemplary improved unwind stand showing according to the present disclosure showing a positionable roll grasping apparatus in the form of a robot disposed integrally with the frame and the first and second lattice disposed above the rolls of convolutely wound web material.

Another embodiment of the improved unwind stand 10a is illustrated in FIG. 8. The improved unwind stand 10a is provided with a frame 12a. The frame 12a includes various components, such as structural supports and plates. As shown, the improved unwind stand 10a may have a plurality of faces, including a first face 26a and a second face 28a. A cavity 30a may be defined intermediate the first face 26a and the second face 28a.

The improved unwind stand 10a may comprise a plurality of mandrels 40g, 40h, 40i, 40j, 40k, 40l extending from a face of the improved unwind stand 10a, such as the first face 26a. The mandrels 40g, 40h, 40i, 40j, 40k, 40l may extend generally perpendicular to the first face 26a, or may be positioned at any other suitable angle. In one embodiment, the improved unwind stand 10a includes a first splicer 42a and a second splicer 44a. The first splicer 42a and the second splicer 44a can be positioned on the improved unwind stand 10a in any suitable location, such as above a given pair of mandrels 40g, 40h, 40i, 40j, 40k, 40l. As illustrated in FIG. 8, the first splicer 42a may be configured to receive a web material 48a. Similarly, the second splicer 44a may be configured to receive a web material 46a and a web material 48a.

The improved unwind stand 10 may further comprise a first lattice 62a disposed above the mandrel pair 40g/40h. The first lattice 62a may comprise a plurality of rollers 64a and a complimentary plurality of rollers 66a mounted to the frame 12a. The number of rollers 64a, 66a in the first lattice 62a may vary depending on the type of web material being fed through the first lattice 62a and the feed speed of the web material 46a, 48a. The second lattice 72a may similarly comprise a plurality of rollers 74a and a plurality of rollers 76a mounted to the frame 12a disposed above mandrel pair 40i/40j. The number of rollers in the first lattice 62a may differ from the number of rollers in the second lattice 72a, as the number of rollers used is based on characteristics of the web material being fed through the lattices 62a, 72a, such as web material 46a, 48a.

In one embodiment, a roll 104a of the second web material 48a maybe mounted on the mandrel 40h. The web material 48a may be unwound from the roll 104a and fed into and pass through the splicer 42a. Once passing through the splicer 42a, the web material 48a may enter the first lattice 62a. As illustrated in FIG. 8, the web material 48a may be looped over a roller 66a and then extend to a roller 64a. The web material 48a may then extend between a series of complimentary rollers in the first lattice 62a thereby forming a "festoon." The web material 48a may be directed toward downstream equipment.

First and second web materials 46a, 48a can be provided to the improved unwind stand 10a through means known to those of skill in the art. For example, as shown, first and second web materials 46a, 48a can be provided to the improved unwind stand 10a through the use of carts (not shown). By way of example only, the carts can be provided with a quantity of convolutely wound rolls of web material suitable for use as first and second web materials 46a, 48a.

Further, the improved unwind stand 10a may include mandrels on other faces that are configured to receive rolls of web material. In one embodiment, the second face 28a may comprise a set of mandrels. Rolls of web material may be mounted on these mandrels and during operation downstream equipment may be continuously fed with web material from at least one of the rolls. It is to be appreciated that in some embodiments the second face 28a may comprise at least one mandrel configured to receive a roll of web material. Further, in some embodiments, the second face 28a may comprise at least two mandrels, with each mandrel configured to receive a roll of web material. Additionally, the second face 28a may comprise a splicer, similar to splicer 42a, for example.

A robot 200a can provide the various first and second web materials 46a, 48a to the improved unwind stand 10a. A six-axis industrial electric robot 200a was found suitable. In a preferred embodiment, a robot 200a is provided in a configuration that is cooperatively disposed upon 12a. In other words, robot 200a can be provided with a support assembly that is physically attached to frame 12a and is still capable of loading, unloading, and/or unwinding the first and second web materials 46a, 48a in cooperative and connective engagement with any of the components of the improved unwind stand 10a. This can include frame 12a, first and/or second splicers 42a, 44a, mandrels 40g, 40h, 40i, 40j, 40k, 40l first and/or second dancers 50a, 52a, first and second metering rolls, or any of the mandrels 40 and idler rollers disposed upon frame 12a.

Figure 9:
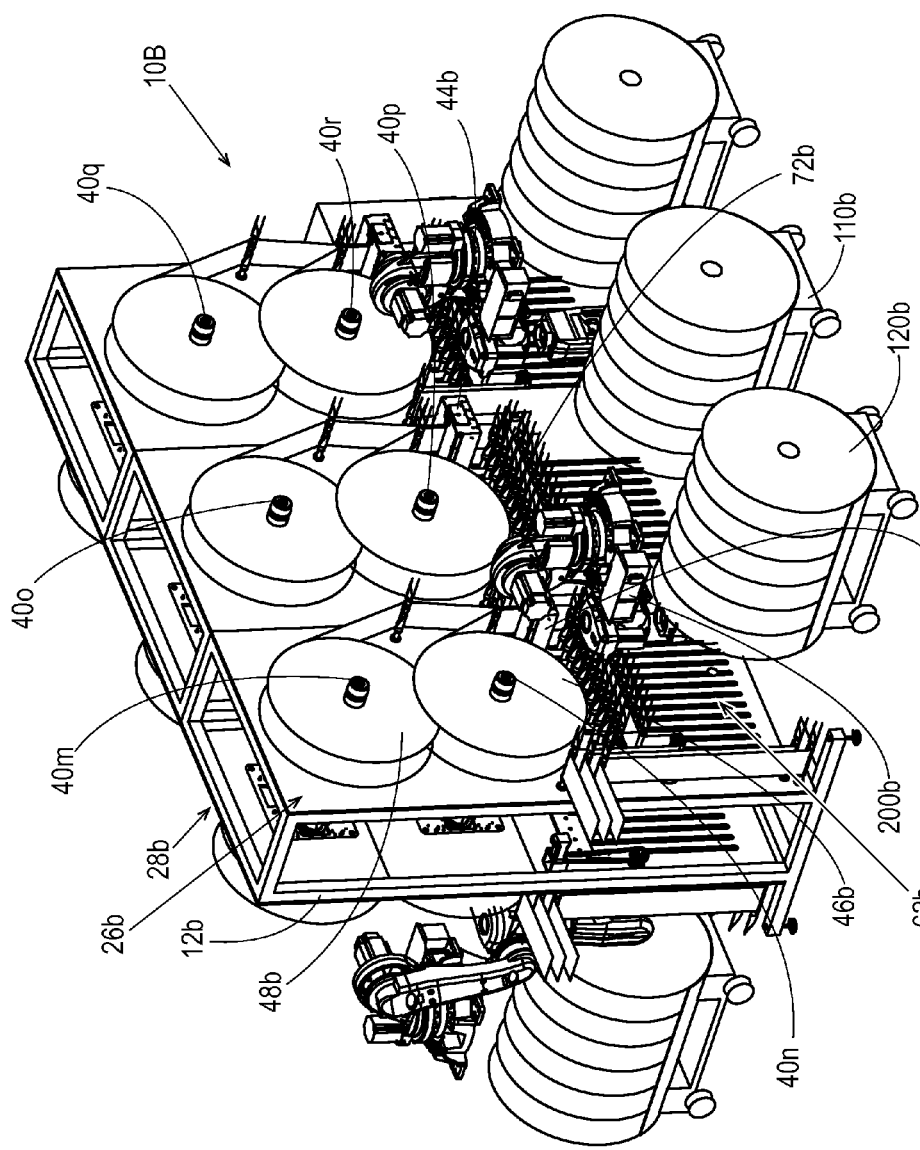
FIG. 9 is a perspective view of an alternative embodiment of exemplary improved unwind stand showing according to the present disclosure showing a positionable roll grasping apparatus in the form of a robot disposed integrally with the frame and the first and second lattice disposed below the rolls of convolutely wound web material.

Yet another embodiment of the improved unwind stand 10b is illustrated in FIG. 9. The improved unwind stand 10b is provided with a frame 12b. The frame 12b includes various components, such as structural supports and plates. As shown, the improved unwind stand 10b may have a plurality of faces, including a first face 26b and a second face 28b.

The improved unwind stand 10b may comprise a plurality of mandrels 40m, 40n, 40o, 40p, 40q, 40r extending from a face of the improved unwind stand 10b, such as the first face 26b. The mandrels 40m, 40n, 40o, 40p, 40q, 40r may extend generally perpendicular to the first face 26*b*, or may be positioned at any other suitable angle. As shown, the improved unwind stand 10*b* preferably includes a first splicer 42*b* and a second splicer 44*b*. The first splicer 42*b* and the second splicer 44*b* can be positioned on the improved unwind stand 10*b* in any suitable location, such as above a given pair of mandrels 40*m*, 40*n*, 40*o*, 40*p*, 40*q*, 40*r*. As illustrated, the first splicer 42*b* may be configured to receive web materials 46*b*, 48*b*. Similarly, the second splicer 44*b* may be configured to receive a web material 46*b* and a web material 48*b*.

The improved unwind stand 10*b* may further comprise a first lattice 62*b* disposed below the mandrel pair 40*m*/40*n*. The first lattice 62*b* may comprise a plurality of complimentary plurality of rollers. The second lattice 72*b* may similarly comprise a plurality of complementary rollers mounted to the frame 12*b* disposed above mandrel pair 40*o*/40*p*.

Web material 48*b* may be unwound fed into and pass through the splicer 42*b*. Once passing through the splicer 42*b*, the web material 48*b* may enter the first lattice 62*b* to form a festoon. The web material 48*b* may then be directed toward downstream equipment.

First and second web materials 46*b*, 48*b* can be provided to the improved unwind stand 10*b* through the use of carts 110*b*. By way of example only, the carts can be provided with a quantity of convolutely wound rolls of web material suitable for use as first and second web materials 46*b*, 48*b*.

A robot 200*b* used for positionable roll grasping apparatus 150 can provide the various first and second web materials 46*b*, 48*b* to the improved unwind stand 10*b*. In the preferred embodiment shown in FIG. 9, robot 200*b* is provided in a configuration that is cooperatively disposed upon 12*b*. In other words, positionable roll grasping apparatus 150 (provided as robot 200*b*) is not physically attached to frame 12*b* and is still capable of providing first and second web materials 46*b*, 48*b* in cooperative and connective engagement with any of the components of the improved unwind stand 10*b*. However, one of skill in the art would recognize that robot 200*b* could be physically attached to frame 12*b* and be capable of providing first and second web materials 46*b*, 48*b* in cooperative and connective engagement with any of the components of the improved unwind stand 10*b*.

Figure 10:
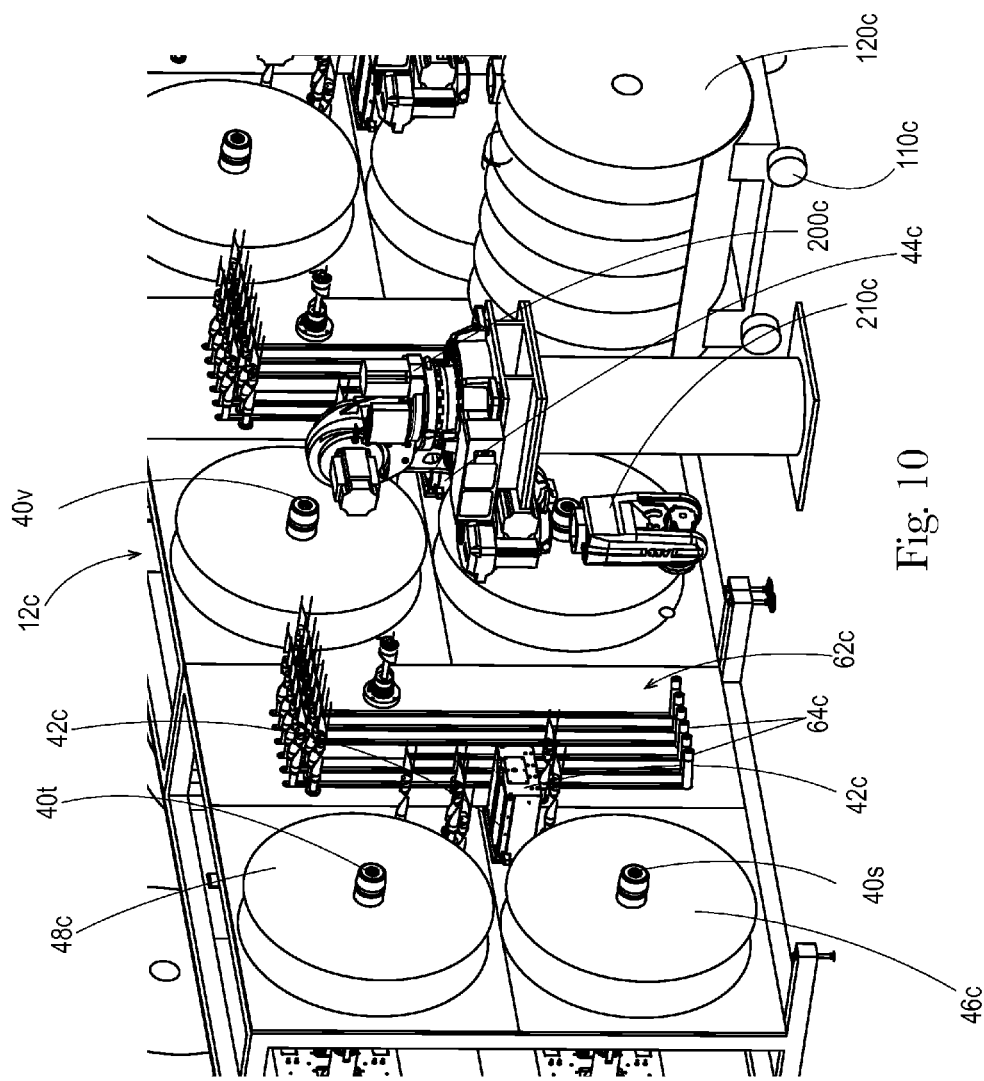
FIG. 10 is a perspective view of an alternative embodiment of exemplary improved unwind stand showing according to the present disclosure showing a positionable roll grasping apparatus in the form of a robot disposed integrally with the frame and the first and second lattice disposed adjacent the rolls of convolutely wound web material.

Yet another embodiment of the improved unwind stand 10*b* is illustrated in FIG. 10. The improved unwind stand 10*b* comprising a plurality of mandrels 40*s*, 40*t*, 40*v* (only shown) extending from a face of the improved unwind stand 10*c*. As shown, the improved unwind stand 10*c* preferably includes a first splicer 42*c* and a second splicer 44*c*. The first splicer 42*c* and the second splicer 44*c* can be positioned on the improved unwind stand 10*b* in any suitable location, such as adjacent a given pair of mandrels 40*s*/40*t*. As illustrated, the first splicer 42*b* may be configured to receive web materials 46*c*, 48*c*. Similarly, the second splicer 44*c* may be configured to receive a web material 46*c* and a web material 48*c*.

The improved unwind stand 10*c* may further comprise a first lattice 62*c* disposed adjacent the mandrel pair 40*s*/40*t*. The first lattice 62*c* may comprise a plurality of complimentary plurality of rollers 64*c*, 66*c*. The second lattice 72*c* may similarly comprise a plurality of complementary rollers disposed adjacent a second mandrel pair (not shown)/40*v*.

Web material 48*c* may be unwound fed into and pass through the splicer 42*c*. Once passing through the splicer 42*c*, the web material 48*c* may enter the first lattice 62*c* to form the festoon. The web material 48*c* may then be directed toward downstream equipment. The first and second web materials 46*c*, 48*c* can be provided to the improved unwind stand 10*c* through the use of carts 110*c*. By way of example only, the carts can be provided with a quantity of convolutely wound rolls of web material suitable for use as first and second web materials 46*c*, 48*c*.

A robot 200*c* can provide the various first and second web materials 46*c*, 48*c* to the improved unwind stand 10*c*. In the preferred embodiment shown in FIG. 10, robot 200*c* and the associated arm 210C is provided in a configuration that is cooperatively disassociated with frame 12*c* but is integral with the equipment disposed thereon. In other words, robot 200*c* is physically unattached to frame 12*c* and is still capable of providing first and second web materials 46*c*, 48*c* in cooperative and connective engagement with any of the components of the improved unwind stand 10*c*.

FIGS. 16-20 depict an exemplary use of the unwind stand 10 of the present description that can provide an overall discussion of a method to deliver a plurality of web materials to downstream manufacturing equipment. In particular, FIGS. 15-19 depict an exemplary method to provide rolls of convolutely wound web materials to an exemplary unwind stand 10 of the present disclosure using the components described herein. As shown, positionable roll grasping apparatus 150 (provided as robot 200) is not in direct contacting engagement with unwind stand 10 (i.e., robot 200 is positioned external to unwind stand 10).

Figure 16:
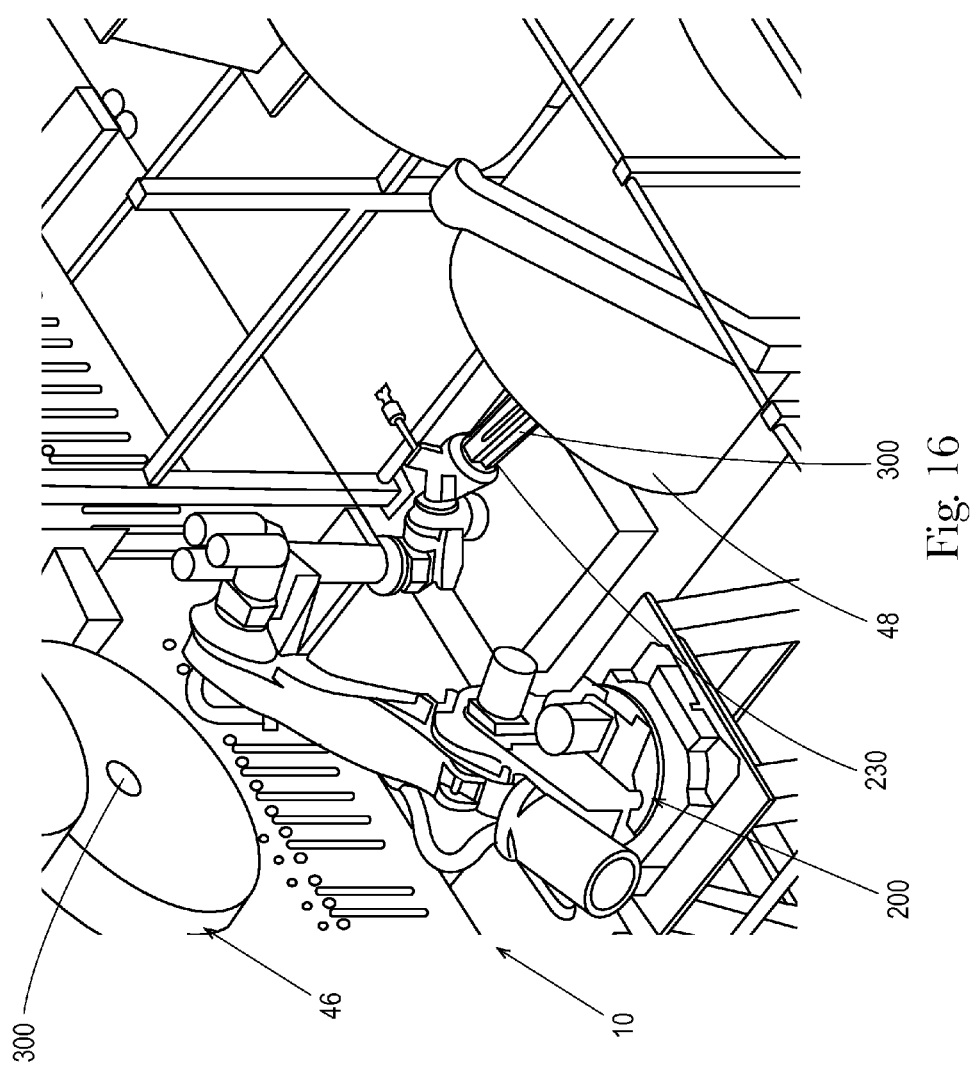
FIG. 16 is a perspective view an exemplary robot and end effector in the form of a mandrel assuming contacting engagement with the hollow core portion of a web material.

FIG. 16 provides for an exemplary positionable roll grasping apparatus 150 (provided as robot 200) having an end effector 230 in the form of mandrel 300 having mandrel shafts 320 assume contacting engagement with the hollow core portion of a second web material 48. As can be seen a first web material 46 is engaged with a mandrel 300 having mandrel shafts 320 disposed upon unwind stand 10. First web material 46 is being convolutley unwound from first web material 46 and is directed toward a downstream manufacturing operation.

Figure 17:
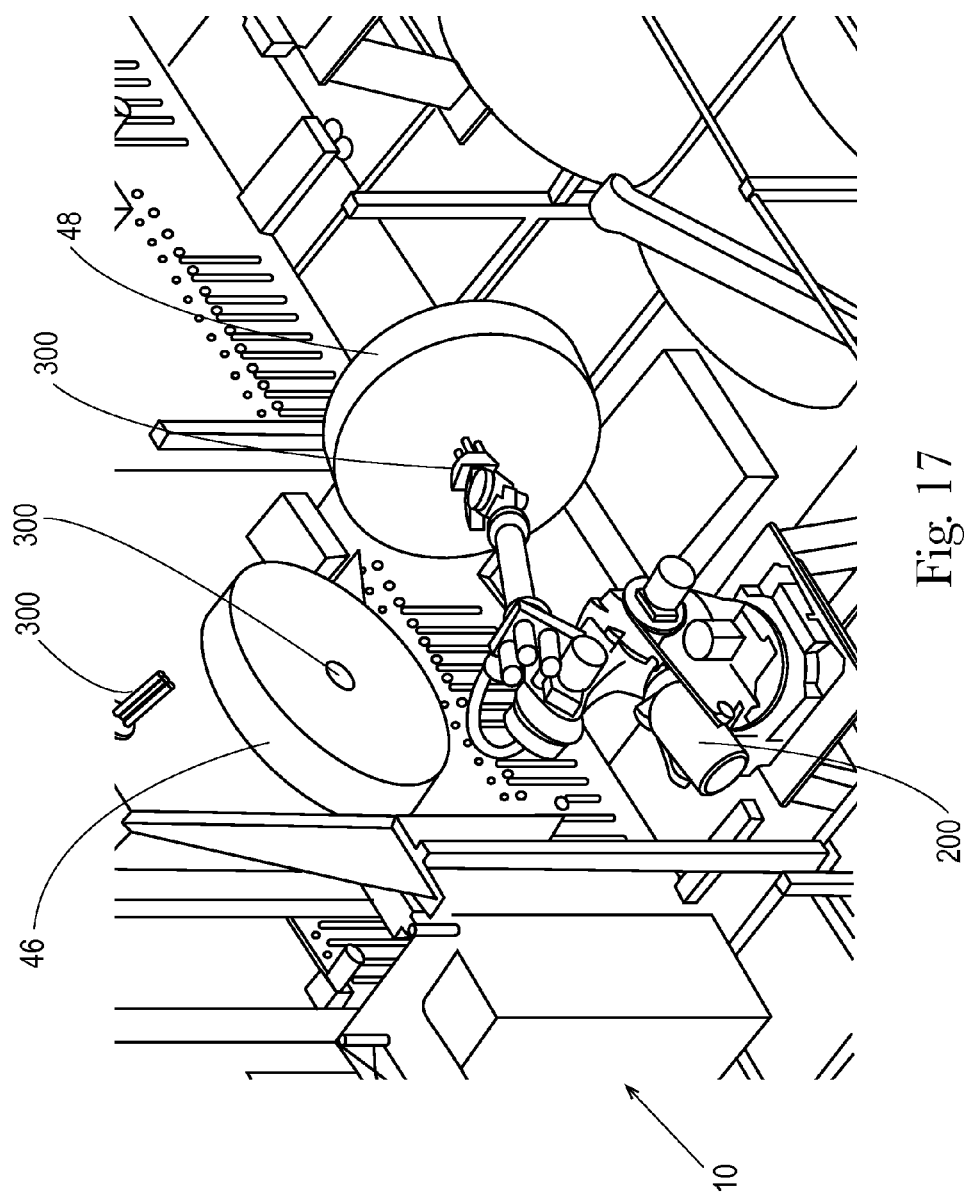
FIG. 17 is a perspective view of the robot of FIG. 16 transporting the web material into eventual contacting and mating engagement with an empty mandrel disposed upon an exemplary unwind stand.

FIG. 17 provides an exemplary perspective view of positionable roll grasping apparatus 150 (provided as robot 200) transporting second web material 48 into eventual contacting and mating engagement with an empty mandrel 300 disposed upon unwind stand 10. As robot 200 is positioning the second web material 48, first web material 46 is being unwound to provide web material to a downstream manufacturing operation.

Figure 18:
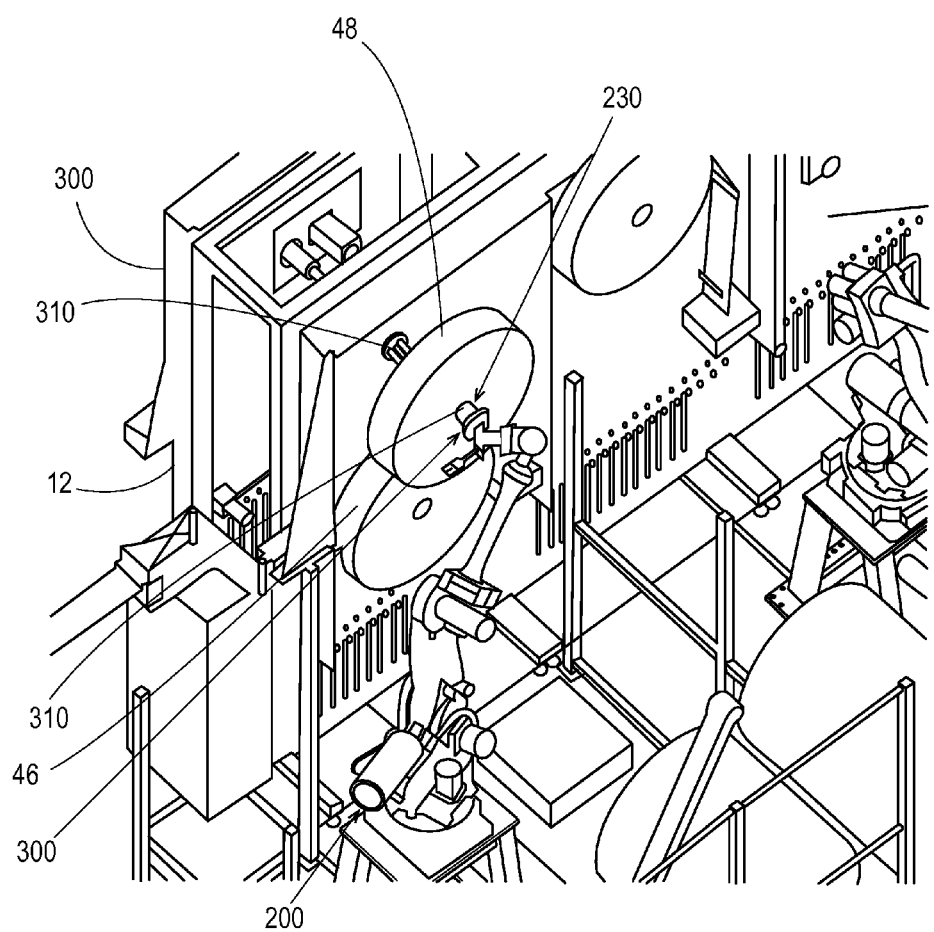
FIG. 18 is a perspective view of the robot of FIG. 16 disposing the web material into contacting and mating engagement with an empty mandrel disposed upon the unwind stand.

FIG. 18 provides an exemplary perspective view of positionable roll grasping apparatus 150 (provided as robot 200) disposing second web material 48 into contacting and mating engagement with an empty mandrel 300 disposed upon unwind stand 10. Here, the mandrel arms 310 of mandrel 300 forming end effector 230 of robot 200, as described herein, are aligning to provide cooperative and interleaving engagement with the mandrel arms 310 of mandrel 300 disposed upon frame 12 of unwind stand 10 with the use of position controllers as would be done and known to one of skill in the art. In other words, the mandrel arms 310 in arrested contact with second web material 48 are aligning with the interstitial spaces disposed between mandrel arms 310 of mandrel 300 disposed upon frame 12 of unwind stand 10. As second web material 48 is brought into proximate contact with the mandrel 300 disposed upon frame 12 of unwind stand 10, second web material is positioned relative to frame 12 and or any processing equipment disposed or intended to be disposed thereupon.

Figure 19:
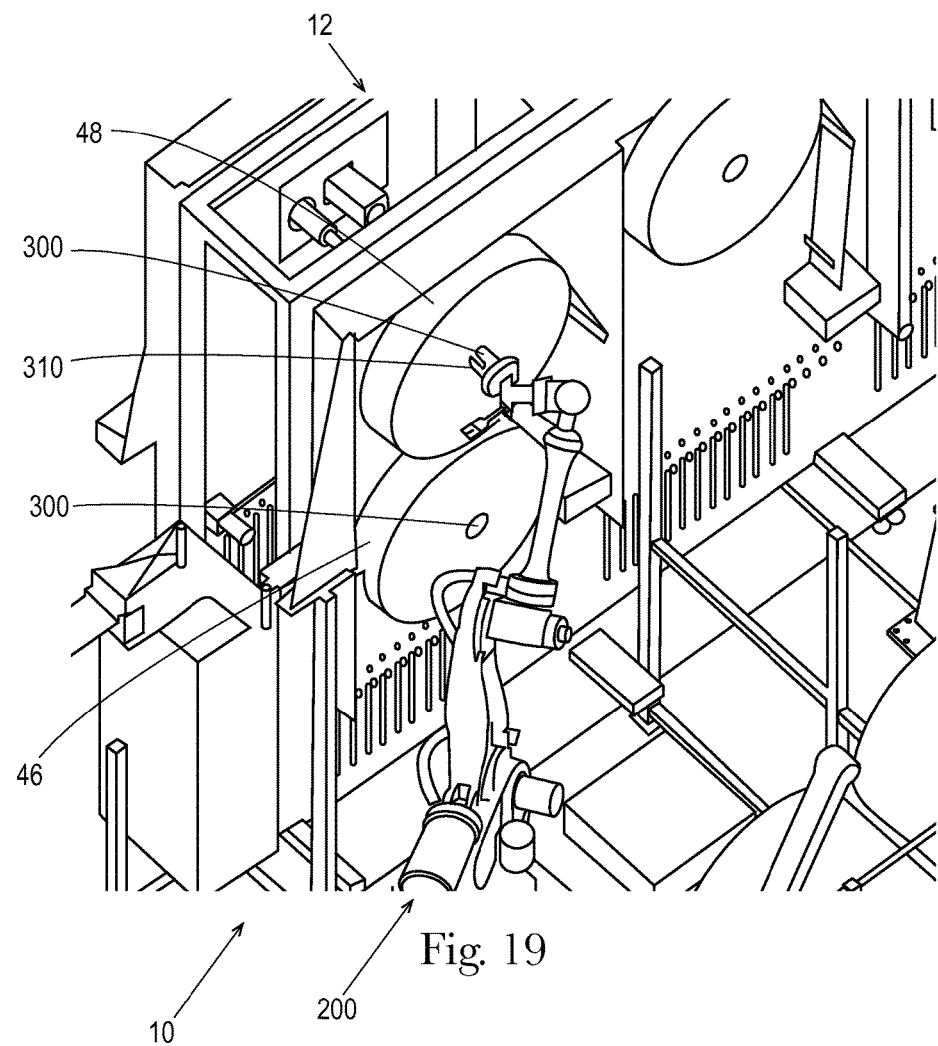
FIG. 19 is a perspective view of the positionable roll grasping apparatus in the form of a robot of FIG. 16 disengaging the end effector from the second web material; and, FIG. 20 is a perspective view of the robot of FIG. 16 completely disengaged from the second web material and ready for a new or different task.
Figure 20:
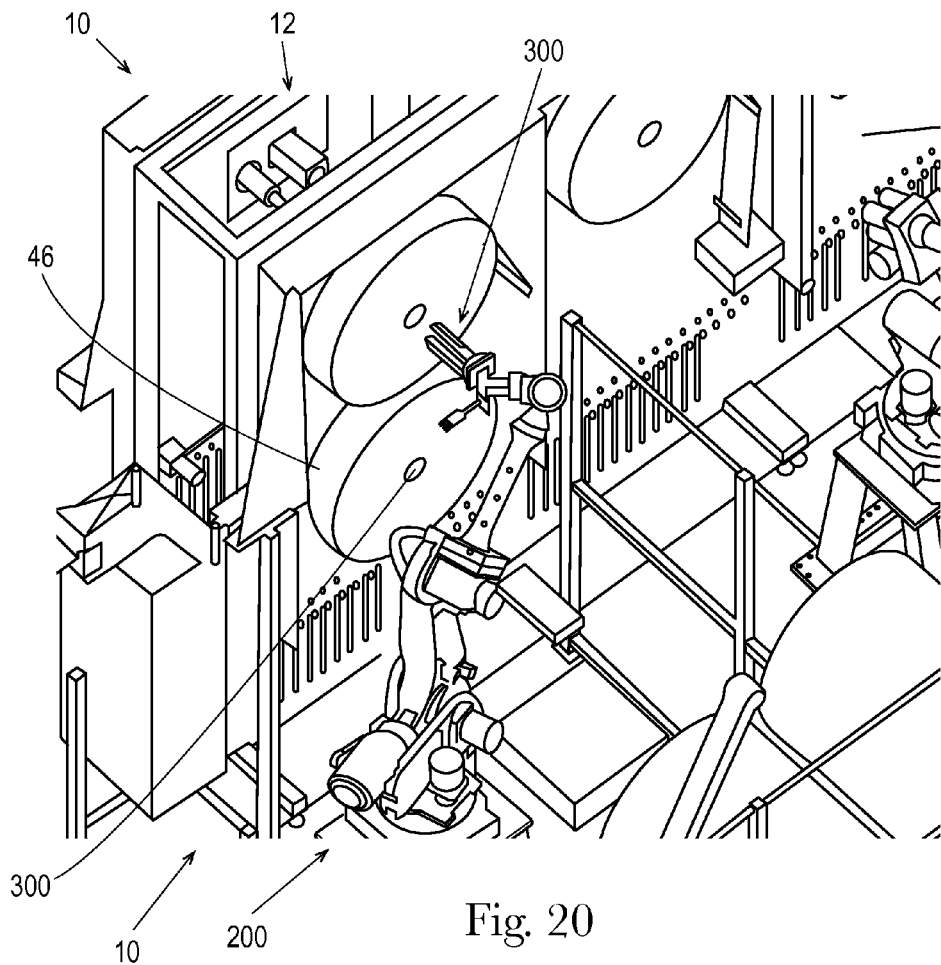

FIGS. 19-20 provides exemplary perspective views of positionable roll grasping apparatus 150 (provided as robot 200) disengaging end effector 230 comprising mandrel 300 from second web material 48 which is now in contacting and mating engagement with the mandrel 300 disposed upon frame 12 of unwind stand 10. At this point, robot 200 can be provided with a new or different task relative to the production of materials associated with unwind stand 10.

All publications, patent applications, and issued patents mentioned herein are hereby incorporated in their entirety by reference. Citation of any reference is not an admission regarding any determination as to its availability as prior art to the claimed invention.

The dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A mandrel suitable for supporting and unwinding a convolutely wound web material, a portion of said convolutely wound web material forming a hollow core therein, said mandrel comprising:
   a. a mandrel shaft having a longitudinal axis, said mandrel shaft being capable of rotating about said longitudinal axis;
   b. a plurality of mandrel arms extending from said mandrel shaft, each of said mandrel arms being disposed and rotatable about said longitudinal axis;
   c. at least one expansion element disposed upon a respective each of said mandrel arms, said at least one expansion element being expandable radially away from said respective mandrel arm relative to said longitudinal axis;
   d. said core of said convolutely wound web material being disposable about each of said mandrel arms, said at least one expansion element being expandable into contacting and releasable engagement with said portion of said convolutely wound web material forming said hollow core, said convolutely wound web material being fixably and releasably disposed about each of said mandrel arms; and,
   e. wherein said plurality of mandrel arms are coextensively and cooperatively interengageable with a plurality of mandrel arms extending from a second mandrel.

2. The mandrel of claim 1 wherein each of said plurality of mandrel arms is positioned orbitally and equidistant about said longitudinal axis.

3. The mandrel of claim 1 wherein said convolutely wound web material is repositionable from said plurality of arms extending from said mandrel shaft of said mandrel to said plurality of mandrel arms extending from said second mandrel.

4. The mandrel of claim 1 wherein said plurality of mandrel arms extending from said second mandrel each have at least one expansion element disposed thereupon, said at least one expansion element disposed upon each of said plurality of mandrel arms extending from second mandrel being expandable into contacting and releasable engagement with said portion of said convolutely wound web material forming said hollow core when said hollow core is disposed thereabout.

5. The mandrel of claim 4 wherein said convolutley wound web material is transferrable from said plurality of mandrel arms extending from said mandrel shaft of said mandrel to said plurality of mandrel arms extending from said second mandrel when said mandrel arms extending from said mandrel shaft of said mandrel and said plurality of mandrel arms extending from said second mandrel are cooperatively engaged.

6. The mandrel of claim 5 wherein said convolutley wound web material is transferred from said plurality of mandrel arms extending from said mandrel shaft of said mandrel to said plurality of mandrel arms extending from said second mandrel when said at least one expansion element disposed upon each of said respective mandrel arms of said mandrel contract radially away toward said respective mandrel arm relative to said longitudinal axis and said at least one expansion element disposed upon each of said plurality of mandrel arms extending from second mandrel expand into contacting and releasable engagement with said portion of said convolutely wound web material forming said hollow core when said mandrel arms extending from said mandrel shaft of said mandrel and said plurality of mandrel arms extending from said second mandrel are cooperatively engaged.

7. The mandrel of claim 1 wherein said mandrel is provided as an end effector for a robot.

8. The mandrel of claim 1 wherein said mandrel is attached to a frame forming an unwind stand for unwinding a convolutely wound web material.

9. An end effector for a robot, said end effector comprising:
   a. a mandrel shaft having a longitudinal axis, said mandrel shaft being capable of rotating about a longitudinal axis;
   b. a plurality of mandrel arms extending from said mandrel shaft, each of said mandrel arms being disposed and rotatable about said longitudinal axis;
   c. at least one expansion element disposed upon a respective each of said mandrel arms, said at least one expansion element being expandable radially away from said respective mandrel arm relative to said longitudinal axis;
   d. wherein said plurality of mandrel arms are coextensively and cooperatively interengageable with a second end effector, said second end effector comprising:
   e. a second mandrel shaft having a second longitudinal axis, said mandrel shaft being capable of rotating about said second longitudinal axis;
   f. a second plurality of mandrel arms extending from said second mandrel shaft, each of said second plurality of mandrel arms being disposed and rotatable about said second longitudinal axis; and, g. at least one second expansion element disposed upon a respective each of said second plurality of mandrel arms, said at least one second expansion element being expandable radially away from said respective mandrel arm of said second plurality of mandrel arms relative to said second longitudinal axis; and, h. wherein said end effector and said second end effector are cooperatively interengageable when said longitudinal axis and said second longitudinal axis are collinear.

10. The end effector of claim 9 wherein each of said plurality of mandrel arms is positioned orbitally and equidistant about said longitudinal axis.

11. The end effector of claim 9 wherein said second end effector is a mandrel.

12. The end effector of claim 11 wherein said mandrel extends from a frame.

13. The end effector of claim 12 wherein a convolutley wound web material disposable about said plurality of mandrel arms.

14. The end effector of claim 13 wherein said convolutley wound web is repositionable from said end effector to said mandrel.

15. The end effector of claim 13 wherein said convolutley wound web material is transferred from said end effector to said mandrel when said at least one expansion element disposed upon each of said respective mandrel arms of said end effector contract radially away toward said respective mandrel arm relative to said longitudinal axis and said second at least one expansion element disposed upon each of said second plurality of mandrel arms extending from second end effector expand into contacting and releasable engagement with a portion of said convolutely wound web material forming a hollow core when said mandrel arms of said end effector and said plurality of mandrel arms extending from said second end effector are cooperatively engaged.

* * * * *